United States Patent
Sim et al.

(10) Patent No.: US 10,432,653 B2
(45) Date of Patent: Oct. 1, 2019

(54) METHOD AND APPARATUS FOR DETECTING ANOMALY TRAFFIC

(71) Applicant: PENTA SECURITY SYSTEMS INC., Seoul (KR)

(72) Inventors: Sang Gyoo Sim, Seoul (KR); Seok Woo Lee, Seoul (KR); Seung Young Park, Chuncheon-si (KR); Duk Soo Kim, Seoul (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 38 days.

(21) Appl. No.: 15/832,050

(22) Filed: Dec. 5, 2017

(65) Prior Publication Data
US 2019/0036952 A1    Jan. 31, 2019

(30) Foreign Application Priority Data
Jul. 28, 2017   (KR) .................... 10-2017-0096317

(51) Int. Cl.
*H04L 29/06* (2006.01)
*G06N 20/00* (2019.01)
(Continued)

(52) U.S. Cl.
CPC .......... *H04L 63/1425* (2013.01); *G06F 17/18* (2013.01); *G06K 9/6218* (2013.01);
(Continued)

(58) Field of Classification Search
CPC . H04L 63/1425; H04L 63/1441; G06F 17/18; G06N 3/08; G06K 9/6218
(Continued)

(56) References Cited

U.S. PATENT DOCUMENTS

| 2008/0249999 A1* | 10/2008 | Renders ................ G06F 16/355 |
| 2009/0079330 A1* | 3/2009 | Koyama ............ H01L 51/0005 313/504 |

(Continued)

FOREIGN PATENT DOCUMENTS

| KR | 1020090054196 A | 5/2009 | |
| KR | 20090079330 A * | 7/2009 | ............. H04L 12/22 |

(Continued)

OTHER PUBLICATIONS

Christian Szegedy et al; "Inception-v4, Inception-ResNet and the Impact of Residual Connections on Learning", arXiv:1602.07261v2 [cs.CV] Aug. 23, 2016, 12 pages.

(Continued)

*Primary Examiner* — Aravind K Moorthy
*Assistant Examiner* — Peiliang Pan

(57) ABSTRACT

Disclosed is a method for detecting anomaly traffic using an autoencoder based on an inception-residual network-v2 which is one type of machine learning methods, the method including generating a plurality of encoders on the basis of traffic data for learning; generating a plurality of pieces of image data on the basis of traffic data for each session, which is a detection target; and determining whether the traffic data for each session is abnormal using at least one among the traffic data for learning, the plurality of encoders, and the plurality of pieces of image data.

16 Claims, 16 Drawing Sheets

(51) Int. Cl.
*G06F 17/18* (2006.01)
*G06K 9/62* (2006.01)
*G06N 3/08* (2006.01)

(52) U.S. Cl.
CPC .............. *G06N 3/08* (2013.01); *G06N 20/00* (2019.01); *H04L 63/1441* (2013.01)

(58) Field of Classification Search
USPC .......................................................... 726/23
See application file for complete search history.

(56) References Cited

U.S. PATENT DOCUMENTS

| | | | |
|---|---|---|---|
| 2011/0004101 A1* | 1/2011 | Yang | A61B 8/0858 600/443 |
| 2013/0018650 A1* | 1/2013 | Moore | G06F 17/2818 704/9 |
| 2015/0091775 A1* | 4/2015 | Jang | H03H 7/463 343/846 |
| 2017/0134401 A1* | 5/2017 | Medvedovsky | H04L 63/1416 |
| 2017/0149830 A1* | 5/2017 | Kim | H04L 63/1425 |
| 2018/0176232 A1* | 6/2018 | Rodriguez | H04L 63/145 |
| 2018/0240011 A1* | 8/2018 | Tan | G06F 17/18 |
| 2018/0307912 A1* | 10/2018 | Selinger | G06K 9/00771 |
| 2018/0324053 A1* | 11/2018 | Beyer | H04L 41/142 |
| 2018/0367192 A1* | 12/2018 | O'Shea | H04B 7/0452 |
| 2019/0026466 A1* | 1/2019 | Krasser | G06F 21/566 |

FOREIGN PATENT DOCUMENTS

| | | | | |
|---|---|---|---|---|
| KR | 1020090079330 A | 7/2009 | | |
| KR | 1020110035336 A | 4/2011 | | |
| KR | 1020140039343 A | 4/2014 | | |
| KR | 20150091775 A | * | 8/2015 | .......... H04L 43/045 |
| KR | 1020150091775 A | | 8/2015 | |
| KR | 101644998 B1 | | 8/2016 | |

OTHER PUBLICATIONS

Korean Office Action dated Mar. 12, 2018; Appln. No. 10-2017-0096317.

Korean Final Office Action dated Jun. 20, 2018; Appln. No. 10-2017-0096317.

Korean Notification of Granting a Patent Right dated Aug. 3, 2018; Appln. No. 10-2017-0096317.

Chieh Lin, et al; "Deep Adversarial 3D Shape Net", 9 pages, Class Project 2016.

Satyajit Yadav, et al; "Detection of Application Layer DDoS Attack by Feature Learning Using Stacked Autoencoder", 2016 International Conference on Computational Techniques in Information and Communication Technologies (ICCTICT), 6 pages, Mar. 11-13, 2016.

* cited by examiner

METHOD AND APPARATUS FOR DETECTING ANOMALY TRAFFIC

CLAIM FOR PRIORITY

This application claims priority to Korean Patent Application No. 2017-0096317 filed on Jul. 28, 2017 in the Korean Intellectual Property Office (KIPO), the entire contents of which are hereby incorporated by reference.

BACKGROUND

1. Technical Field

Example embodiments of the present invention relate in general to the field of Internet communications and more specifically to a method and an apparatus for detecting anomaly traffic using an autoencoder based on an inception-residual network-v2 (i.e., an inception-resnet-v2) which is one type of machine learning methods.

2. Related Art

Recently, due to the rapid development of Internet technology, an amount of traffic based on a hypertext transfer protocol (HTTP) is rapidly increasing between a server and the Internet. Here, HTTP is a communication protocol that is used to exchange hypertext documents, and hypertext refers to a technique for organically connecting and linking texts and pictures with each other by placing specific keywords in the middle of documents, thereby exhibiting the documents as a single document even though the documents are different from each other, and also allowing to easily reference these documents. Our society has improved the quality of life by exchanging lots of information as an increasing amount of traffic, but at the same time, there are serious social problems due to an increase in attacks targeting large networks.

Therefore, traffic analysis techniques have been developed to detect such attacks on the large networks, and most of the traffic analyzing techniques detect a quantitative change in the number of packets or in byte size.

However, a method for detecting anomaly traffic on the basis of only a quantitative change may face a problem of failing to detect an attack causing a small quantitative change, or incorrectly detecting a case in which a normal but excessive quantitative change occurs as anomaly traffic.

SUMMARY

Accordingly, example embodiments of the present invention are provided to substantially obviate one or more problems due to limitations and disadvantages of the related art.

Example embodiments of the present invention provide a method for detecting anomaly traffic.

Other example embodiments of the present invention provide an apparatus for detecting anomaly traffic.

In some example embodiments, a method for detecting anomaly traffic includes generating a plurality of encoders on the basis of traffic data for learning; generating a plurality of pieces of image data on the basis of traffic data for each session, which is a detection target; and determining whether the traffic data for each session is abnormal using at least one among the traffic data for learning, the plurality of encoders, and the plurality of pieces of image data.

Wherein the generating of the plurality of encoders on the basis of traffic data for learning includes: dividing the traffic data for learning into a preset unit; converting the divided traffic data for learning into a plurality of pieces of image data for learning; and generating the plurality of encoders on the basis of the plurality of pieces of image data for learning.

Wherein the generating of the plurality of encoders on the basis of the plurality of pieces of image data for learning includes learning the plurality of pieces of image data for learning through an autoencoder based on an inception-residual network-v2 using convolutional neural networks to generate the plurality of encoders.

Wherein the generating of the plurality of pieces of image data on the basis of traffic data for each session, which is a detection target, includes: dividing the traffic data for each session into a preset unit; and converting the divided traffic data for each session, which is a detection target, into the plurality of pieces of image data.

Wherein the determining of whether the traffic data for each session is abnormal includes: calculating binary cross entropy (BCE) by inputting the plurality of pieces of image data to the autoencoder; and determining whether the traffic data for each session is abnormal by comparing the BCE with a preset threshold value.

Wherein the determining of whether the traffic data for each session is abnormal by comparing the BCE with the preset threshold value includes determining that the traffic data for each session is abnormal when the BCE is equal to or greater than the preset threshold value.

Wherein the determining of whether the traffic data for each session is abnormal by comparing the BCE with the preset threshold value further includes determining whether the traffic data for each session is abnormal using a clustering algorithm when the BCE is less than the preset threshold value.

Wherein the determining of whether the traffic data for each session is abnormal using the clustering algorithm includes: generating a plurality of data clusters using the clustering algorithm on the basis of the traffic data for learning and the plurality of encoders; and determining whether the traffic data for each session is abnormal using the plurality of encoders, the plurality of data clusters, and the plurality of pieces of image data.

Wherein the generating of the plurality of data clusters using the clustering algorithm on the basis of the traffic data for learning and the plurality of encoders includes: inputting the divided traffic data for learning to the plurality of encoders and storing outputs of the plurality of encoders; and generating one or more data clusters according to the plurality of encoders by applying the clustering algorithm to the stored outputs of the plurality of encoders.

Wherein the determining of whether the traffic data for each session is abnormal using the plurality of encoders, the plurality of data clusters, and the plurality of pieces of image data includes: generating output data according to the plurality of encoders by inputting the traffic data for each session to the plurality of encoders, respectively; and when all the output data according to the plurality of encoders are not included in the data clusters corresponding to the plurality of encoders on the basis of the same encoder, determining the traffic data for each session as anomaly traffic data.

In other example embodiments, an apparatus for detecting anomaly traffic includes a processor; and a memory configured to store at least one command executed through the processor, wherein the at least one command is executed to generate a plurality of encoders on the basis of traffic data for learning, to generate a plurality of pieces of image data on the basis of the traffic data for each session, which is a detection target, and to determine whether the traffic data for each session is abnormal using at least one among the traffic data for learning, the plurality of encoders, and the plurality of pieces of image data.

Wherein the at least one command is executed to divide the traffic data for learning into a preset unit, to convert the divided traffic data for learning into a plurality of pieces of image data for learning, and to generate the plurality of encoders on the basis of the plurality of pieces of image data for learning.

Wherein the at least one command is executed to learn the plurality of pieces of image data for learning through an autoencoder based on an inception-residual network-v2 using convolutional neural networks to generate the plurality of encoders.

Wherein the at least one command is executed to divide the traffic data for each session, which is a detection target, into the preset unit, and to convert the divided traffic data for each session, which is a detection target, into the plurality of pieces of image data.

Wherein the at least one command is executed to input the plurality of pieces of image data to the autoencoder to calculate binary cross entropy (BCE), and to determine whether the traffic data for each session is abnormal by comparing the BCE with a preset threshold value.

Wherein, when the BCE is equal to or greater than the preset threshold value, the at least one command is executed to determine that the traffic data for each session is abnormal.

Wherein, when the BCE is less than the preset threshold value, the at least one command is executed to determine whether the traffic data for each session is abnormal using a clustering algorithm.

Wherein the at least one command is executed to generate a plurality of data clusters using the clustering algorithm on the basis of the traffic data for learning and the plurality of encoders, and to determine whether the traffic data for each session is abnormal using the plurality of encoders, the plurality of data clusters, and the plurality of pieces of image data.

Wherein the at least one command is executed to input the divided traffic data for learning to the plurality of encoders and store outputs of the plurality of encoders, and to generate one or more data clusters according to the plurality of encoders by applying the clustering algorithm to the stored outputs of the plurality of encoders.

Wherein the at least one command is executed to generate output data according to the plurality of encoders by inputting the traffic data for each session to the plurality of encoders, respectively, and, when all the output data according to the plurality of encoders are not included in the data clusters corresponding to the plurality of encoders on the basis of the same encoder, to determine the traffic data for each session as anomaly traffic data.

In accordance with the present invention, a false positive rate can be reduced using machine learning in detection of anomaly traffic.

Further, in accordance with the present invention, an amount of computation can be effectively reduced, and a layer can be increased using the autoencoder based on the inception-residual network-v2 (i.e., an inception-rennet-v2), so that high accuracy and speed can be provided in detection of anomaly traffic.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
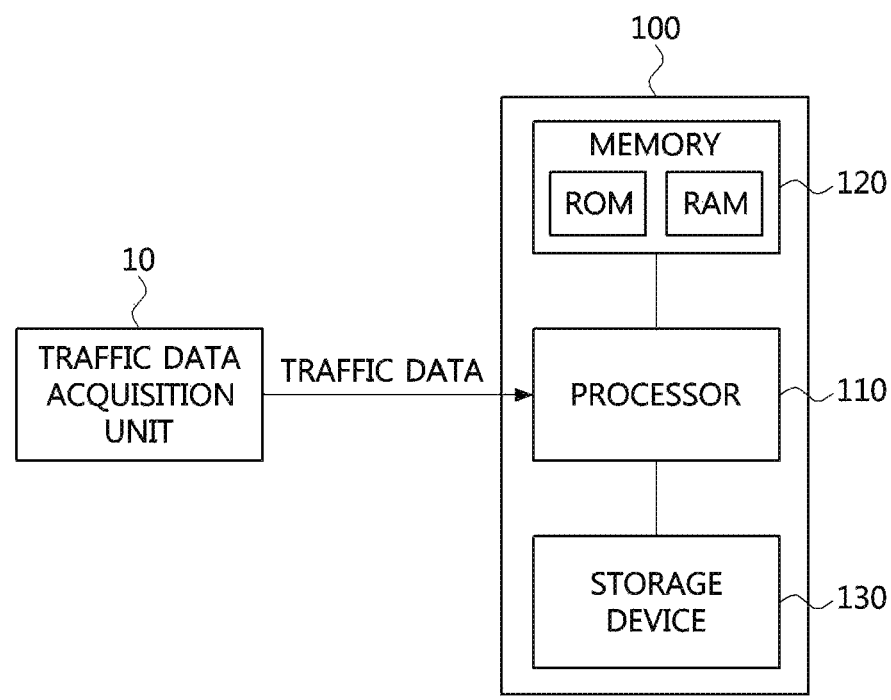
FIG. 1 is a block diagram of an apparatus for detecting anomaly traffic according to one embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to the example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative embodiments, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In this disclosure, the term "traffic" may refer to web traffic which refers to an amount of data exchanged by visitors to a web site, and may refer to Internet traffic which refers to a flow of data via the Internet. Further, traffic may refer to Internet traffic using a hypertext transfer protocol (HTTP). Here, HTTP may be a stateless protocol, and the stateless protocol may not request an HTTP server to hold information or a status for each user during a multiple request period.

FIG. 1 is a block diagram of an apparatus for detecting anomaly traffic according to one embodiment of the present invention.

Referring to FIG. 1, an anomaly traffic detection apparatus 100 according to one embodiment of the present invention may include at least one processor 110, a memory 120, and a storage device 130.

The processor 110 may execute a program command stored in the memory 120 and/or the storage device 130. The processor 110 may refer to a central processing unit (CPU), a graphics processing unit (GPU), or a dedicated processor through which methods according to the present invention are performed. The memory 120 and the storage device 130 may be configured with a volatile storage medium and/or a non-volatile storage medium. For example, the memory 120 may be configured with a read only memory (ROM) and/or a random access memory (RAM).

The memory 120 may store and read at least one command which is executed through the processor 110. The at least one command may include a command for generating a plurality of encoders on the basis of traffic data for learning, a command for generating a plurality of pieces of image data on the basis of traffic data for each session that is a detection target, and a command for determining whether the traffic data for each session is abnormal using at least one of the traffic data for learning, the plurality of encoders, and the plurality of pieces of image data.

The commands stored the in memory 120 may be updated by machine learning of the processor 110. The processor 110 may modify the commands stored in the memory 120 through machine learning. The machine learning performed by the processor 110 may be achieved by an unsupervised learning method.

The processor 110 may receive the traffic data for each session that is the detection target from a traffic data acquisition unit 10 according to a command stored in the memory 120, and the traffic data acquisition unit 10 may transmit acquired traffic data for each session to the processor 110.

The processor 110 may generate image data for learning on the basis of the traffic data for learning and generate the plurality of pieces of image data on the basis of the traffic data for each session that is the detection target. Here, the traffic data may refer to traffic data for each HTTP session. The HTTP session may refer to a transaction of a series of network requests and responses. For example, an HTTP client may initiate a request by establishing a transmission control protocol (TCP) connection to a specific port of a server, an HTTP server listening to the specific port may wait for a request message from the HTTP client, and, when receiving the request message, the HTTP server may transmit a status indicating bar such as "HTTP/1.1 200 OK" and a message of its own. Although a body of the message of its own may generally be a requested resource, an error message or other information may be returned, and, here, the request of the HTTP client and the response of the HTTP server may refer to the HTTP session. In other words, the traffic data may refer to character string data. To generate the image data on the basis of the character string data, the processor 110 may convert the character string data into a one-hot vector in a reverse order to generate a matrix, and this will be described in more detail below with reference to FIG. 2.

The processor 110 may utilize the generated image data as learning data of the machine learning to generate an encoder. Here, the machine learning may use an autoencoder which is a convolutional neural network (CNN), or an autoencoder based on an inception-residual network-v2 (i.e., an inception-resnet-v2). Here, a process in which input data is compressed to form a hidden layer may be referred to as encoding, or a portion performing the encoding may be referred to as the encoder. Conversely, a process in which the hidden layer forms the output data may be referred to as decoding, and a portion performing the decoding may be referred to as a decoder. The autoencoder includes the encoder and the decoder which are described above, and this will be described in more detail below with reference to FIG. 3.

The processor 100 may determine whether the traffic data for each session is abnormal by comparing binary cross entropy (BCE), which is an output value obtained by inputting the image data into the autoencoder, with a preset threshold value. In one embodiment of the present invention, since normal traffic data is used in a process of autoencoder learning as the machine learning, when the normal traffic data is converted into image data to be input into the autoencoder, the BCE may have a low value, and, when anomaly traffic data is converted into image data to be input into the autoencoder, the BCE may have a high value. Here, cross entropy (CE) may refer to an index indicating a difference or a distance between two probability distributions, and, as the difference is larger, the CE may have a higher value. That is, since the autoencoder performs the machine learning through the unsupervised learning method, the learning may be continuously performed to reduce a difference between an input data and an output data, so that the BCE having a high value may mean that the anomaly traffic data is input into the autoencoder which learns with the normal traffic data. Accordingly, when the BCE has a value that is equal to or greater than the preset threshold value, the processor 100 may determine the traffic data for each session as the anomaly traffic data.

When the BCE has a value that is less than the preset threshold value, the processor 100 may determine whether the traffic data for each session is abnormal using a clustering algorithm. Here, the clustering algorithm may refer to clustering, multi-dimensional data vectors as adjacent data vectors on the basis of a distance defined in a specific manner, and t-distributed stochastic neighbor embedding (t-SNE) may be used in one embodiment of the present invention as the clustering algorithm. The t-SNE may mean t-distributed stochastic neighbor embedding and refer to one of the machine learning algorithms used for dimensional reduction of data. The t-SNE is a nonlinear dimensional reduction technique and may be used to visualize high-dimensional data by reducing high-dimensional data to two or three dimensional data, and the t-SNE may map similar data to an adjacent two or three dimensional point and other data to a distant point.

The processor 100 may input image data for learning to the encoder, store an output of the encoder, apply the above-described clustering algorithm to the stored output, and cluster outputs adjacent in distance among a plurality of outputs of the clustering algorithm to generate a data cluster corresponding to the encoder. Further, the processor 100 may generate a plurality of data clusters on the basis of a plurality of pieces of image data for learning. Thereafter, the processor 100 may generate output data by inputting image data that is a detection target to the encoder, and, when the output data is included in one of the plurality of data clusters, the processor 100 may determine the traffic data for each session as the normal traffic data, and, when the output data is not included in any one of the plurality of data clusters, the processor 100 may determine that the traffic data for each session is abnormal. Here, the traffic data for learning may be divided into preset units to generate a plurality of pieces of image data for learning, and the plurality of pieces of image data for learning may be generated by a plurality of encoders, so that, in this case, the processor 100 may have a plurality of output data according to the plurality of encoders from single image data that is a detection target, and have a plurality of data clusters according to the plurality of encoders from single image data for learning. Accordingly, when all the plurality of pieces of output data are not included in the plurality of data clusters on the basis of the same encoder, the processor 110 may determine that the traffic data for each session is abnormal.

For example, it is assumed that a first encoder and a first data cluster are generated on the basis of first image data for learning, and, similar to the above-described manner, a second encoder, a second data cluster, a third encoder, and a third data cluster are generated on the basis of second image data for learning and third image data for learning. The processor 110 may generate first output data by inputting image data that is a detection target to the first encoder, and may compare the first output data with the first data cluster. When the first output data is not included in the first data cluster, the processor 110 may generate second output data by inputting the image data that is a detection target to the second encoder, and may compare the second output data with the second data cluster. When the second output data is not included in the second data cluster, the processor 110 may generate third output data by inputting the image data that is a detection target to the third encoder, and may compare the third output data with the third data cluster. When the third output data is not included in the third data cluster, the processor 110 may determine the traffic data for each session, which includes the image data that is a detection target, as anomaly traffic data.

When the traffic data for each session is determined to be abnormal, the processor 110 may provide a user with the determination result. The processor 110 may also provide the user with an alarm indication or an alarm text according to detection of anomaly traffic.

Figure 2:
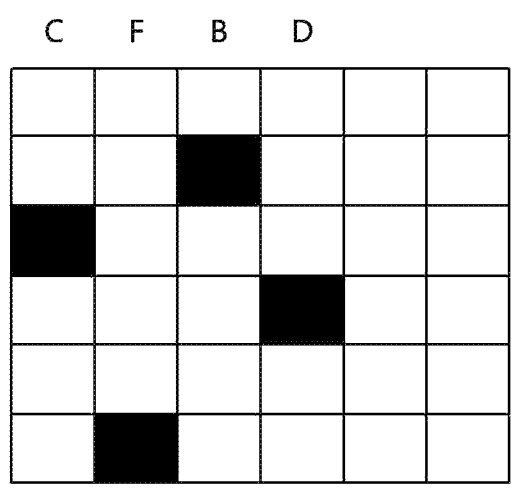
FIG. 2 is a diagram for describing a method for converting traffic data into image data according to one embodiment of the present invention.

FIG. 2 is a diagram for describing a method for converting traffic data into image data according to one embodiment of the present invention.

The anomaly traffic detection apparatus 100 according to one embodiment of the present invention may generate image data from character string data by converting the character string data into a matrix form and recognizing the matrix string form as the image data. In other words, the processor 100 may convert the traffic data for learning and the traffic data for each session that is a detection target into a matrix form, and recognize the transformed matrix form as image data for learning and image data for the detection target.

As a method for converting the character string data into the matrix form, the processor 100 may employ a method for converting traffic data comprised of a character string into a one-hot vector from a last character of a sentence in a reverse order to convert the traffic data into a matrix form. Here, the one-hot vector may refer to a vector whose single dimensional value is 1 and all remaining dimensional values are 0. Further, a matrix form of the one-hot vector may have a $F^{(o)} \times L^{(o)}$ size. Here, $F^{(o)}$ may refer to the number of text types capable of constituting the traffic data, and $L^{(o)}$ may refer to a length of a sentence that can be converted into a matrix.

Further, when a length of a character string of the traffic data is shorter than $L^{(o)}$, an insufficient vector may be represented as 0. When the length of the character string of the traffic data is longer than $L^{(o)}$, a first character of the character string, which corresponds to a size of $L^{(o)}$, may be represented as a vector so as to include a first character of the character string of the traffic data, and a last character of the character string, which corresponds to the size of $L^{(o)}$, may be represented as a vector so as to include a first character of the character string of the traffic data, but this may also be set by the user.

For example, referring to FIG. 2, it is assumed that a text capable of constituting traffic data is "ABCDEF", and $L^{(o)}$ is 6. In this case, $F^{(o)}$ may have a value of 6 as the number of "ABCDEF." Thus, a one-hot vector may have a 6×6 size. In such a setting, when a character string "DBFC" is converted, a last character "C" of the character string may appear in a first column, and "F," "B," and "D" may subsequently appear in a reverse order. Further, since $L^{(o)}$ is 6, $L^{(o)}$ is longer than a length of the character string of 4. Consequently, the remaining fifth and sixth columns may be represented as zero. Since "C" is arranged at a third position of the character string "ABCDEF" capable of constituting the traffic data, "C" may appear in a third row, and subsequently, "F," "B," and "D" may appear in a sixth row, a second row, and a fourth row, respectively. Consequently, as shown in FIG. 2, "C" of "DBFC" may be arranged at (3, 1), "F" thereof may be arranged at (6, 2), and "D" thereof may be arranged at (4, 4).

The anomaly traffic detection apparatus according to one embodiment of the present invention can divide traffic data for learning and traffic data for each session into a preset number, respectively, and convert the divided data into a matrix form according to the above-described matrix transformation method. In other words, the processor 100 may perform a matrix transformation process by dividing traffic data composed of a character string to correspond to the size of $L^{(o)}$.

Figure 3:
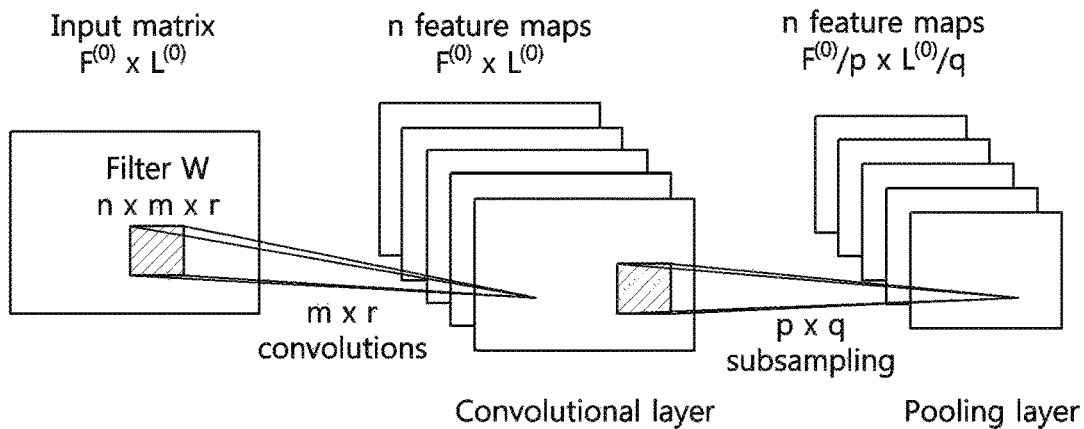
FIG. 3 is a conceptual diagram for describing a convolution operation of a convolutional neural network according to one embodiment of the present invention.

FIG. 3 is a conceptual diagram for describing a convolution operation of a convolutional neural network according to one embodiment of the present invention.

Referring to FIG. 3, a convolutional neural network may refer to machine learning that performs a convolution operation and a pooling operation on input data and accumulates layers, thereby learning the input data. Here, the convolution operation may refer to sweeping of a matrix using a kernel matrix having a predetermined size and transforming of data into another form, and feature maps may refer to images generated through the convolution operation. Here, a value corresponding to each element of the kernel matrix may refer to a weight value. The pulling operation may be subsampling which is a process of reducing a size of an image, and may refer to extracting of a representative value according to a preset method from the result of performing of the convolution operation.

The autoencoder according to one embodiment of the present invention may be implemented using a convolutional neural network, and may correspond to unsupervised in which learning is performed without a teacher signal (i.e., a correct answer).

The autoencoder according to an embodiment of the present invention is an artificial neural network that learns data by encoding input data to generate a hidden layer, decoding the hidden layer to generate output data, comparing the input data with the output data, and adjusting a parameter or a weight value when the encoding and/or the decoding is performed so as to approximate the output data to the input data. The autoencoder is characterized in that, when the learning is completed, a portion performing the decoding is removed and only a portion performing the encoding is used. In this disclosure of the present invention, the portion performing the encoding may be represented as the encoder, and the portion performing the decoding may be represented as the decoder. The autoencoder according to one embodiment of the present invention may be based on an inception-residual network-v2. The inception-residual network-v2 is configured such that a residual network is combined with an inception network structure that is a convolutional neural network, and the inception-residual network-v2 will be described below with reference to FIG. 4. Further, a method for performing encoding and decoding using a convolution will be described in detail below with reference to FIGS. 6 to 13.

Figure 4:
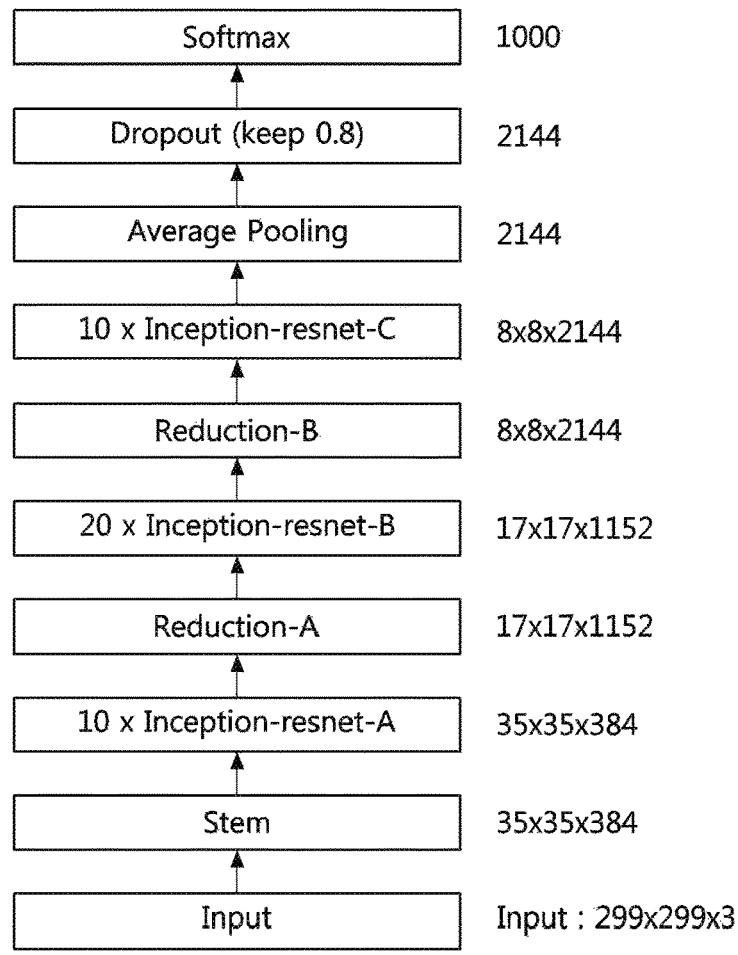
FIG. 4 is a conceptual diagram for describing an inception-residual network-v2 that is the basis of an autoencoder according to one embodiment of the present invention.

FIG. 4 is a conceptual diagram for describing the inception-residual network-v2 that is the basis of the autoencoder according to one embodiment of the present invention.

Referring to FIG. 4, in order to encode input data, the inception-residual network-v2 may include a Stem operation, 10 Inception-resnet-A operations, Reduction-A operation, 20 Inception-resnet-B operations, a Reduction-B operation, 10 Inception-resnet-C operations, an Average Pooling operation, a Dropout operation, and a Softmax operation, and the inception-residual network-v2 may be a network combining characteristics of a inception network capable of reducing an amount of computation to have more layers, with characteristics of a residual network that reduces an output of a lower layer and adds an output of an upper layer to that of the lower layer to resolve a vanishing gradient problem in which learning is impossible as a network depth increases. The inception-residual network-v2 is disclosed in more detail in the paper by Christian Szegedy, entitled "Inception-v4, inception-resnet and the impact of residual connections on learning (2016)." In the inception-residual network-v2 of the above-mentioned paper, a method for receiving an image having a 299×299 size and composed of three RGB channels, that is, input data having a 299×299×3 size, to generate compressed data having a 1000 size has been proposed. However, the inception-residual network-v2 according to the present invention has a structure that is modified from the structure proposed in the above-described paper, and thus the inception-residual network-v2 may include an encoding portion configured to receive input data having a $1 \times L^{(o)} \times F^{(o)}$ size generated according to the method described in FIG. 2 and generate compressed data having a 1000 size, and a decoding portion configured to decode the compressed data into data having the $1 \times L^{(o)} \times F^{(o)}$ size using a decoder which will be described below with reference to FIG. 5.

Figure 5:
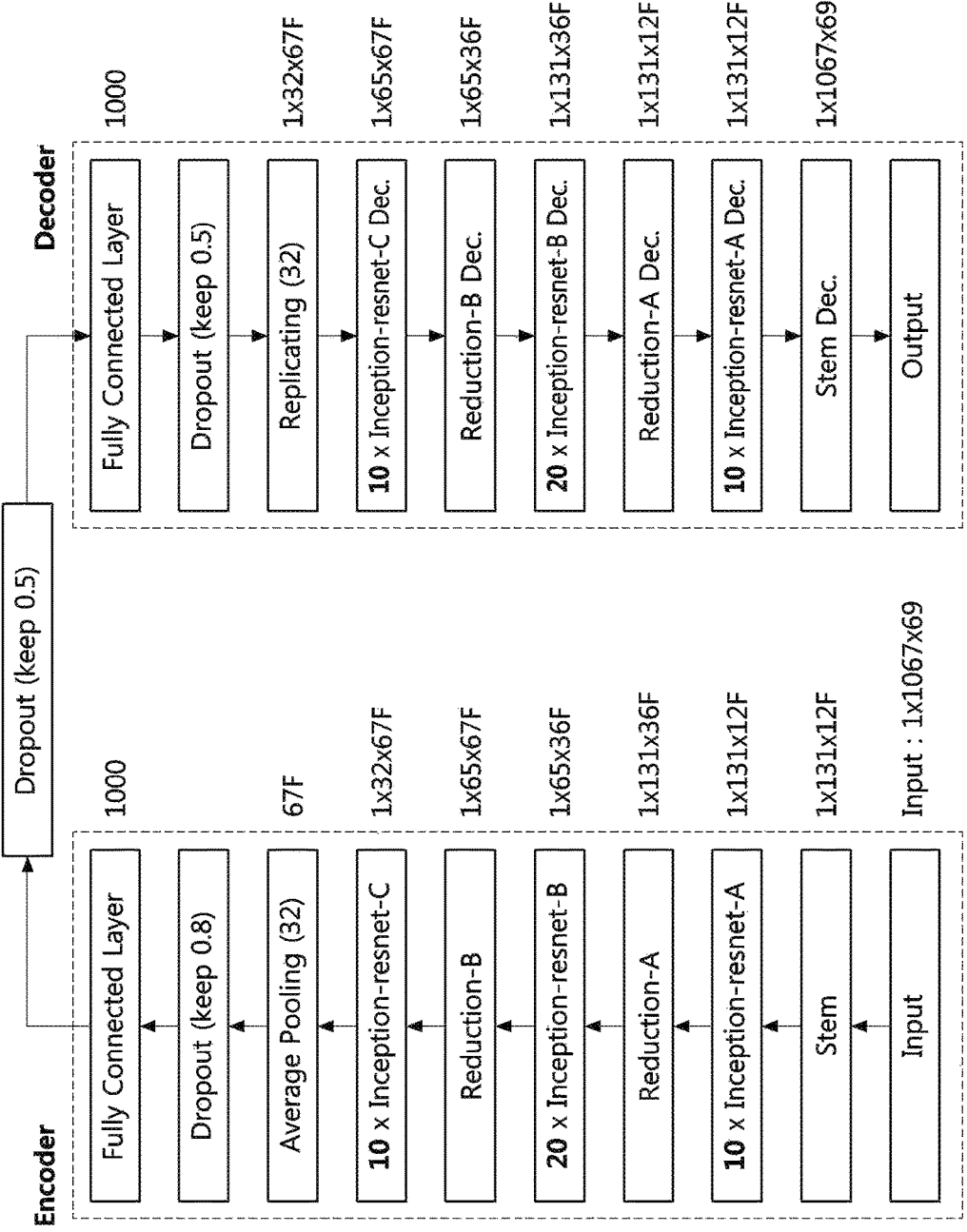
FIG. 5 is a conceptual diagram for describing a configuration of the autoencoder according to one embodiment of the present invention.

FIG. 5 is a conceptual diagram for describing a configuration of the autoencoder according to one embodiment of the present invention.

Referring to FIG. 5, the autoencoder according to one embodiment of the present invention may include encoding operations based on the inception-residual network-v2 and decoding operations corresponding to the encoding operations. The processor 110 may learn learning data using the autoencoder of FIG. 4, compare the learning data with the output data, and adjust a parameter or a weight value to reduce an error between the learning data and the output data. The parameter or the weight value may be adjusted in 10 Inception-resnet-A operations, 20 Inception-resnet-B operations, and 10 Inception-resnet-C operations though scaling of each operation. A more detailed configuration of the autoencoder will be described below with reference to FIGS. 5 to 12.

In this disclosure of the present invention, F may refer to a basic frame size of 128, V may refer to valid convolution or a valid max pooling, stride may refer to an interval with which convolution or max pooling is performed, and Linear may refer to performing full convolution without an activation function. Conv. may refer to convolution, and Conv. Trans. may refer to an inverse of convolution. MaxPool may refer to max pooling, and MaxUnPool may refer to an inverse of max pooling. A×B Conv. may refer to performing convolution with reference to a size of A×B, and A×B MaxPool may refer to performing max pooling with reference to the size of A×B. Descriptions of the above-described symbols may be consistently used with the same meanings in this disclosure of the present invention.

Figure 6A:
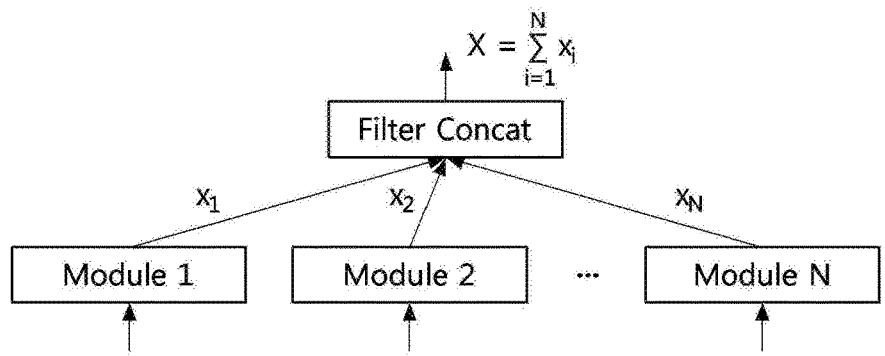
FIG. 6A, FIG. 6B, and FIG. 6C are a conceptual diagram for describing a structure of an encoder in the autoencoder based on the inception-residual network-v2 according to one embodiment of the present invention.
Figure 6B:
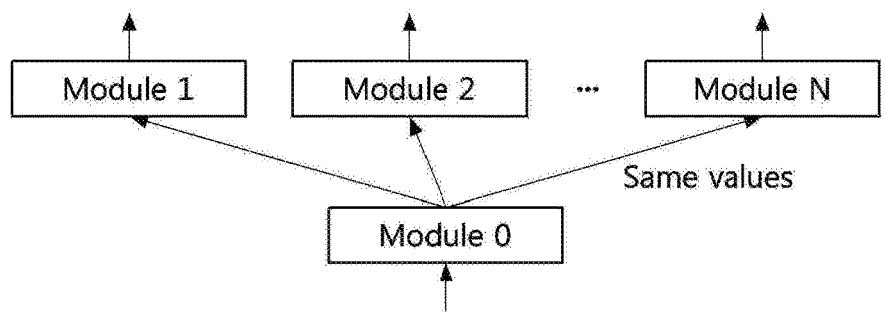
Figure 6C:
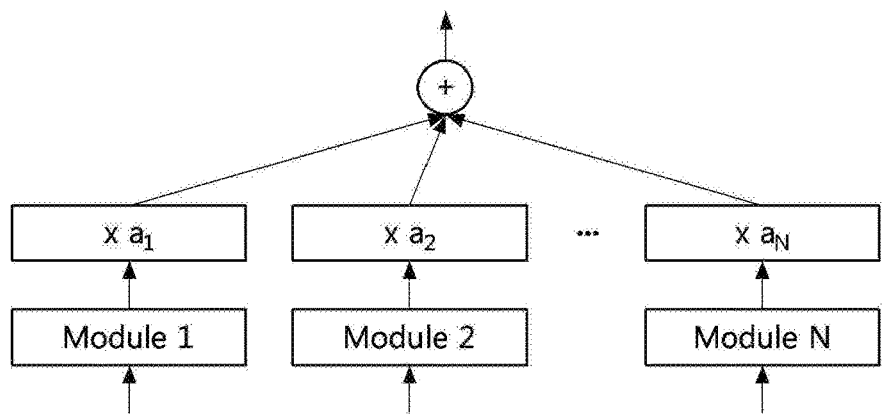

FIG. 6A, FIG. 6B, and FIG. 6C are a conceptual diagram for describing a structure of an encoder in the autoencoder based on the inception-residual network-v2 according to one embodiment of the present invention.

Specifically, FIG. 6A, FIG. 6B, and FIG. 6C are a conceptual diagram for describing summing, distributing, and scaling in an encoding operation, and, referring to FIG. 6A, in an encoding operation of the autoencoder according to one embodiment of the present invention, Filter Concat may sum up output data of modules and may be denoted using a sigma symbol. In other words, output data X of Filter Concat may be denoted by the sum of the output data $x_1$, $x_2$, . . . , and $x_N$ of the modules. Referring to FIG. 6B, in the encoding operation of the autoencoder according to the present invention, distributing may denote that output data is distributed to the same output data. Further, referring to 6C, in the autoencoder of the present invention, scaling sums up values obtained by multiplying the output data of the modules by $a_1$, $a_2$, . . . , and $a_N$, wherein $a_1$, $a_2$, . . . , and $a_N$ may refer to a parameter or a weight value of the encoding portion, and learning may proceed by adjusting $a_1$, $a_2$, . . . , and $a_N$.

Figure 7A:
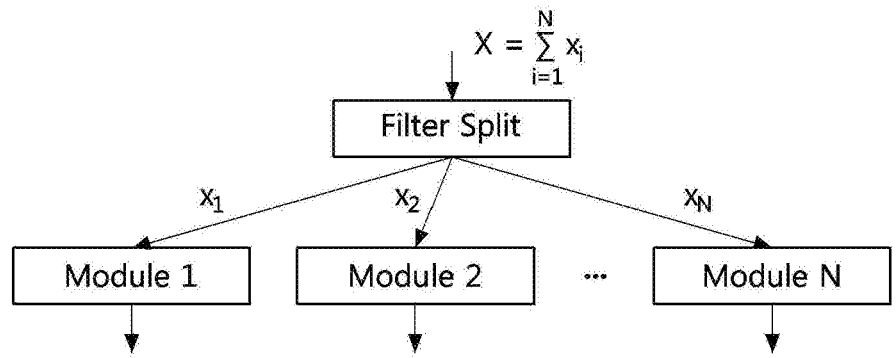
FIG. 7A, FIG. 7B, and FIG. 7C are a conceptual diagram for describing a structure of a decoder corresponding to the structure of the encoder in the autoencoder based on the inception-residual network-v2 according to one embodiment of the present invention.
Figure 7B:
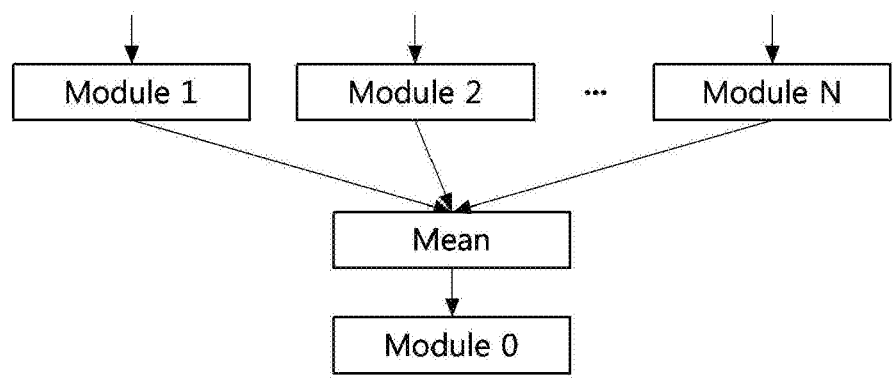
Figure 7C:
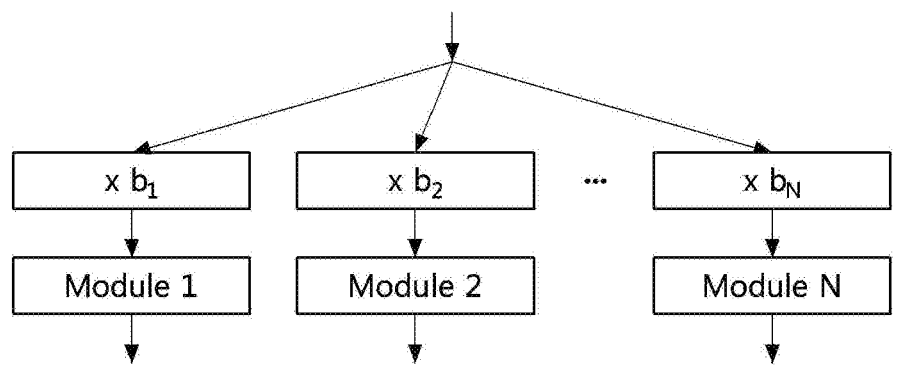

FIG. 7A, FIG. 7B, and FIG. 7C are a conceptual diagram for describing a structure of a decoder corresponding to the structure of the encoder in the autoencoder based on the inception-residual network-v2 according to one embodiment of the present invention;

Specifically, FIG. 7A, FIG. 7B, and FIG. 7C are a conceptual diagram for describing distributing, averaging, and scaling in a decoding operation, and, referring to FIG. 7A, in the decoding operation of the autoencoder according to one embodiment of the present invention, Filter Split may divide output data of an upper module to distribute the divided output data to each module, and the sum of the output data distributed to the modules may be the same as output data of an upper level. As in the encoding operation, Filter Split may also be denoted using a sigma symbol. In other words, output data X of an upper level of Filter Split may be denoted by the sum of the output data $x_1$, $x_2$, . . . , and $x_N$ distributed to the modules. Referring to FIG. 7B, in the decoding operation of the autoencoder according to the present invention, Mean may calculate an average with respect to output data of upper modules. Further, referring to 7C, in the autoencoder of the present invention, scaling distributes output data of an upper module and multiplies the distributed output data by $b_1$, $b_2$, . . . , and $b_N$, wherein $b_1$, $b_2$, . . . , and $b_N$ may refer to a parameter or a weight value of the decoding portion, and learning may proceed by adjusting $b_1$, $b_2$, . . . , and $b_N$.

Figure 8:
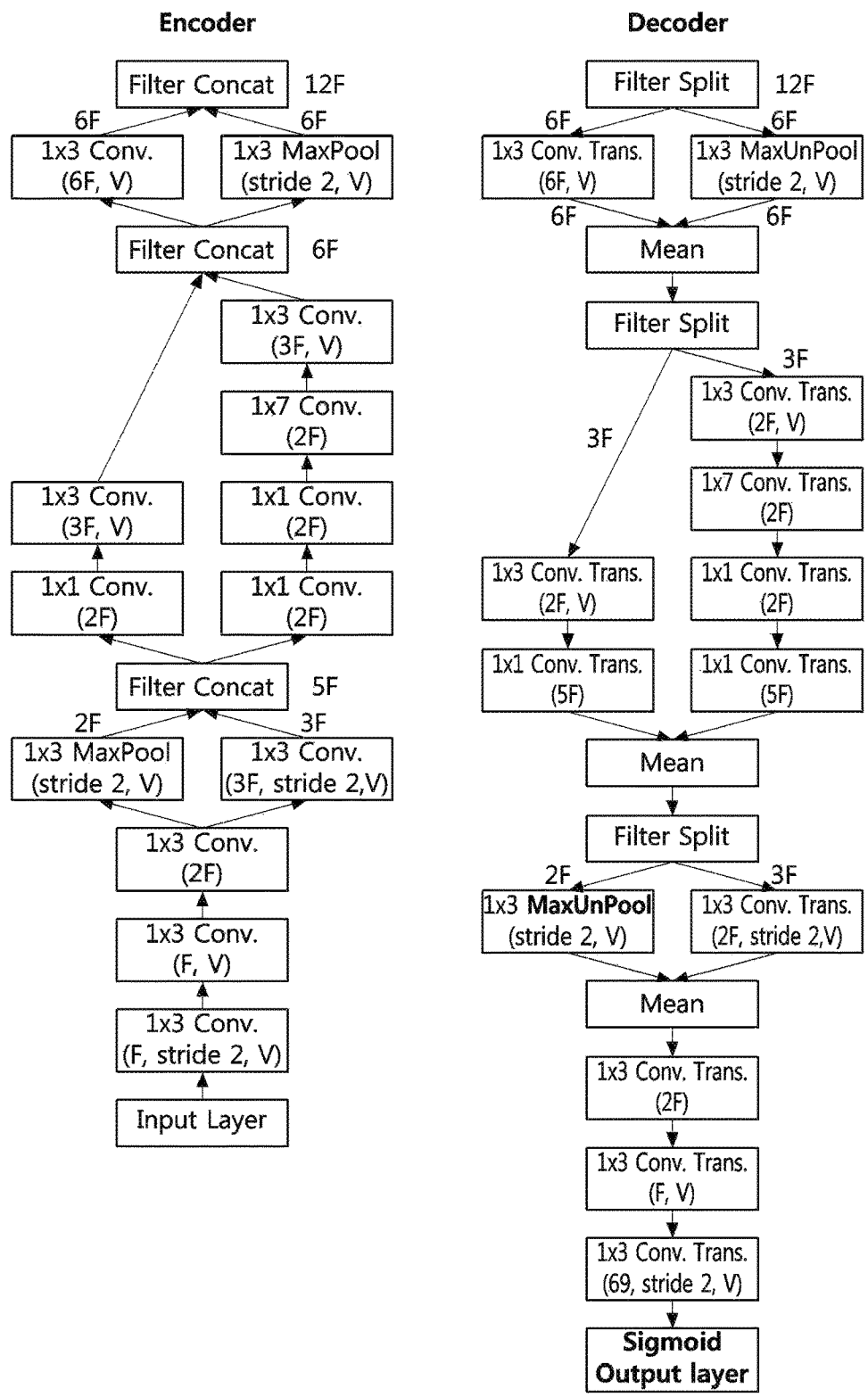
FIG. 8 is a conceptual diagram for describing a Stem operation in the autoencoder based on the inception-residual network-v2 according to one embodiment of the present invention.

FIG. 8 is a conceptual diagram for describing a Stem operation in the autoencoder based on the inception-residual network-v2 according to one embodiment of the present invention;

Referring to FIG. 8, the Stem operation of the autoencoder according to one embodiment of the present invention may be performed in each of the encoder and the decoder of FIG. 5. In other words, the Stem operation of an encoder of FIG. 8 may be performed in the encoder of FIG. 5, and the Stem operation of a decoder of FIG. 8 may be performed in the decoder of FIG. 5. The Stem operation of the encoder may sequentially perform 1×3 Conv.(stride 2), 1×3 Conv., and 1×3 Conv. on input data, distribute output data of the last 1×3 Conv. to perform 1×3 MaxPool(stride 2) and 1×3 Conv.(stride 2), sum the distributed and processed output data and redistribute the summed output data, and sequentially perform 1×1 Conv. and 1×3 Conv. at one side, and 1×1 Conv., 1×1 Conv., 1×7 Conv. and 1×3 Conv. at the other side. 1×3 Conv. and 1×3 MaxPool(stride 2) may be performed by re-summing and redistributing the distributed and processed output data, and then the redistributed and processed output data may be re-summed. Also, the Stem operation of the autoencoder according to the present invention may be identically performed as the Stem operation of a conventional inception-residual network-v2 as well as being performed according to the Stem operation described above, but the present invention is not limited thereto. The Stem operation of the decoder may be performed in reverse order of the Stem operation performed by the encoder.

Figure 9:
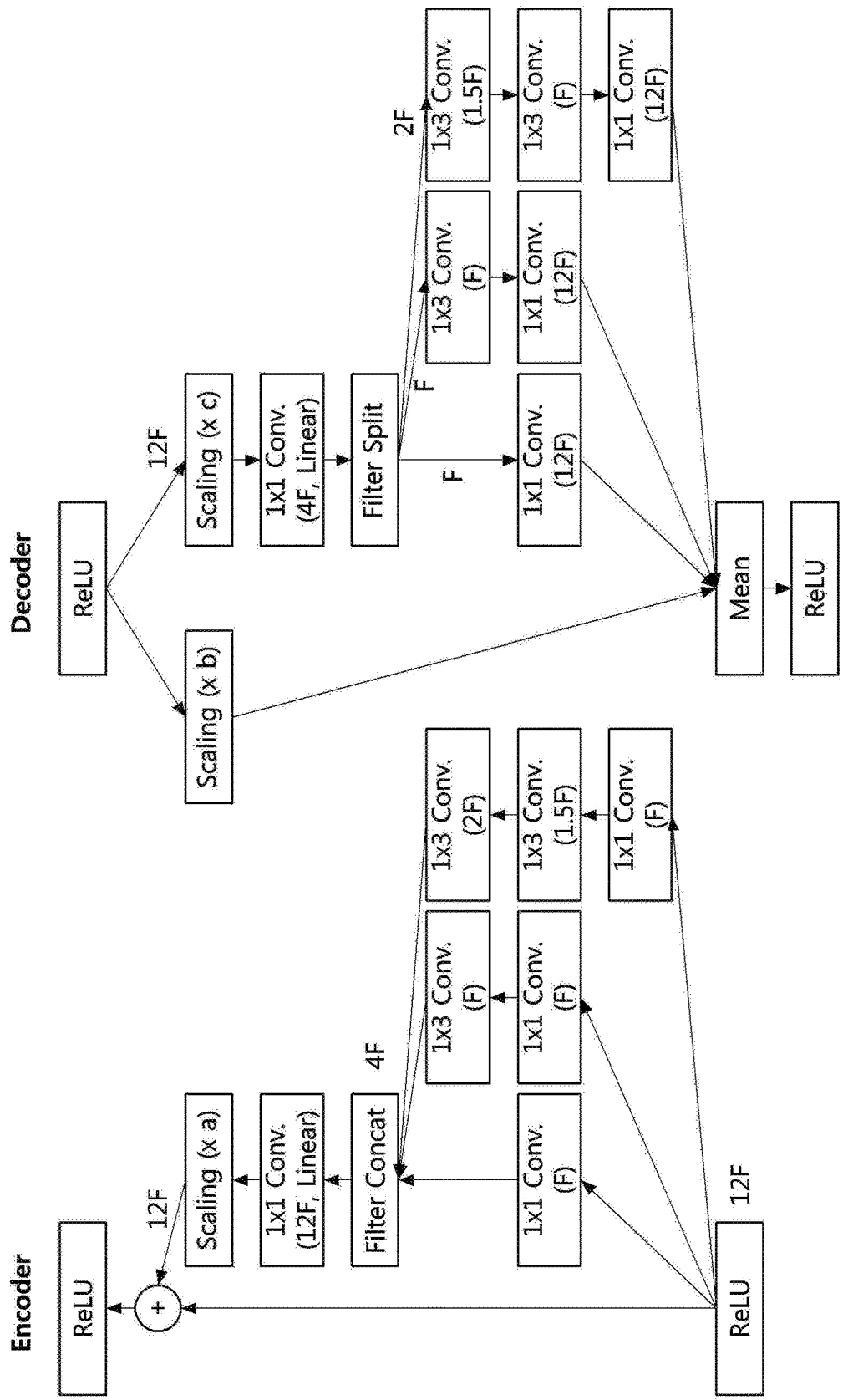
FIG. 9 is a conceptual diagram for describing an Inception-resnet-A operation in the autoencoder based on the inception-residual network-v2 according to one embodiment of the present invention.

FIG. 9 is a conceptual diagram for describing an Inception-resnet-A operation in the autoencoder based on the inception-residual network-v2 according to one embodiment of the present invention.

Referring to FIG. 9, the Inception-resnet-A operation of the autoencoder according to one embodiment of the present invention may be performed in each of the encoder and the decoder of FIG. 5. In other words, the Inception-resnet-A operation of an encoder of FIG. 9 may be performed in the encoder of FIG. 5, and the Inception-resnet-A operation of a decoder of FIG. 9 may be performed in the decoder of FIG. 5. The Inception-resnet-A operation of the encoder may distribute input data into four pieces of data, sequentially perform 1×1 Conv., 1×3 Conv. and 1×3 Conv. on the first distributed data, sequentially perform 1×1 Conv. and 1×3 Conv. on the second distributed data, and perform 1×1 Conv. on the third distributed data. The first, second, and third distributed data may be summed to undergo 1×1 Conv. (Linear) and scaling, and output data having undergone scaling may be added to input data among the four distributed pieces of data, which has not undergone any operation. Also, the Inception-resnet-A operation of the autoencoder according to the present invention may be identically performed as the Inception-resnet-A operation of the conventional inception-residual network-v2 as well as being performed according to the Inception-resnet-A operation described above, but the present invention is not limited thereto. The Inception-resnet-A operation of the decoder may be performed in reverse order of the Inception-resnet-A operation performed by the encoder.

The autoencoder according to one embodiment of the present invention may adjust scaling sizes a, b, and c of the Inception-resnet-A operation, and learning may proceed through the adjustment.

Figure 10:
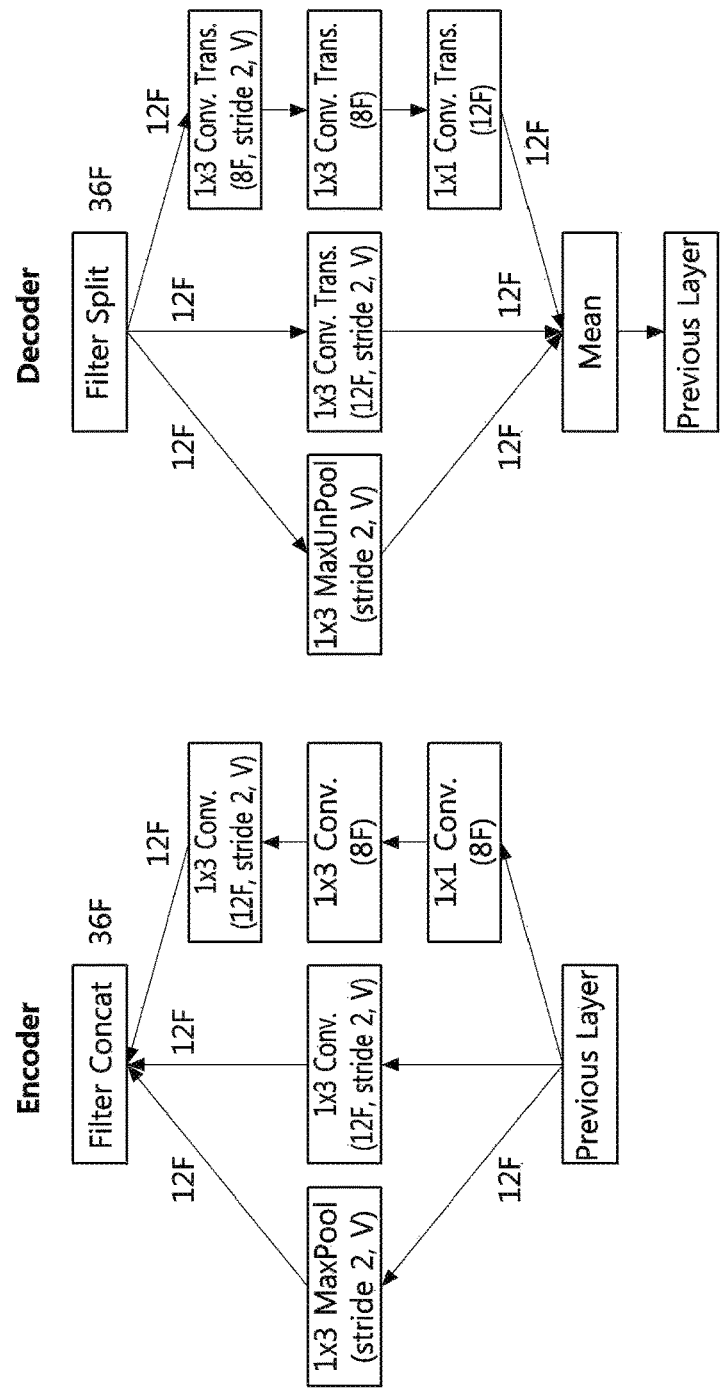
FIG. 10 is a conceptual diagram for describing a Reduction-A operation in the autoencoder based on the inception-residual network-v2 according to one embodiment of the present invention.

FIG. 10 is a conceptual diagram for describing a Reduction-A operation in the autoencoder based on the inception-residual network-v2 according to one embodiment of the present invention.

Referring to FIG. 10, the Reduction-A operation of the autoencoder according to one embodiment of the present invention may be performed in each of the encoder and the decoder of FIG. 5. In other words, the Reduction-A operation of an encoder of FIG. 10 may be performed in the encoder of FIG. 5, and the Reduction-A operation of a decoder of FIG. 10 may be performed in the decoder of FIG. 5. The Reduction-A operation of the encoder may distribute input data into three pieces of data, sequentially perform 1×1 Conv., 1×3 Conv., and 1×3 Conv.(stride 2) on the first distributed data, perform 1×3 Conv.(stride 2) on the second distributed data, and perform 1×3 MaxPool(stride 2) on the third distributed data. Further, the Reduction-A operation of the encoder may sum the distributed and processed input data to generate output data of the Reduction-A operation. Also, the Reduction-A operation of the autoencoder according to the present invention may be identically performed as the Reduction-A operation of the conventional inception-residual network-v2 as well as being performed according to the Reduction-A operation described above, but the present invention is not limited thereto. The Reduction-A operation of the decoder may be performed in reverse order of the Reduction-A operation performed by the encoder.

Figure 11:
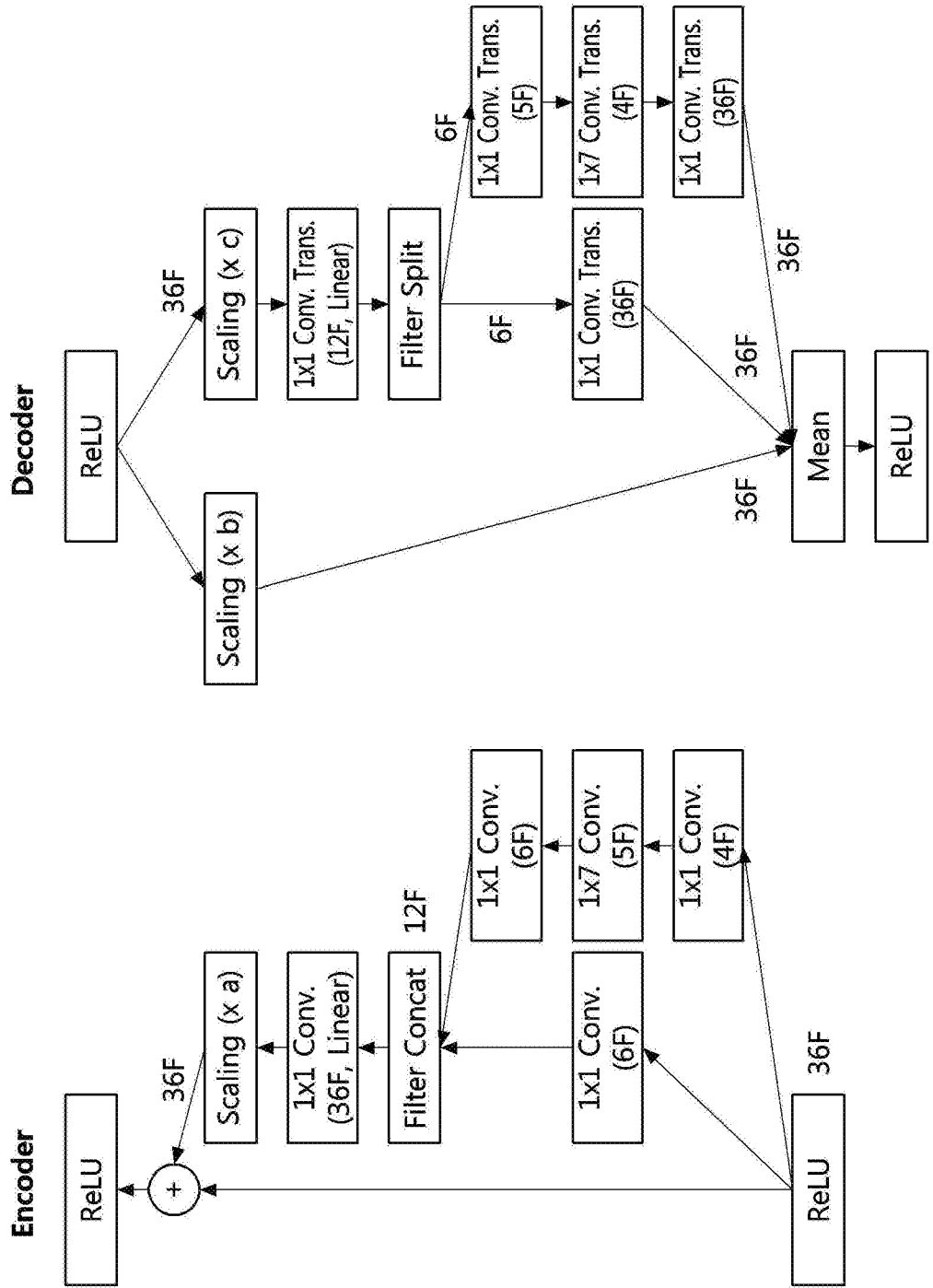
FIG. 11 is a conceptual diagram for describing an Inception-resnet-B operation in the autoencoder based on the inception-residual network-v2 according to one embodiment of the present invention.

FIG. 11 is a conceptual diagram for describing an Inception-resnet-B operation in the autoencoder based on the inception-residual network-v2 according to one embodiment of the present invention;

Referring to FIG. 11, the Inception-resnet-B operation of the autoencoder according to one embodiment of the present invention may be performed in each of the encoder and the decoder of FIG. 5. In other words, the Inception-resnet-B operation of an encoder of FIG. 11 may be performed in the encoder of FIG. 5, and the Inception-resnet-B operation of a decoder of FIG. 11 may be performed in the decoder of FIG. 5. The Inception-resnet-B operation of the encoder may distribute input data into three pieces of data, sequentially perform 1×1 Conv., 1×7 Conv. and 1×1 Conv. on the first distributed data, and perform 1×1 Conv. on the second distributed data. The first and second distributed data may be summed to undergo 1×1 Conv.(Linear) and scaling, and output data having undergone scaling may be added to input data among the three distributed pieces of data, which has not undergone any operation. Also, the Inception-resnet-B operation of the autoencoder according to the present invention may be identically performed as the Inception-resnet-B operation of the conventional inception-residual network-v2 as well as being performed according to the Inception-resnet-B operation described above, but the present invention is not limited thereto. The Inception-resnet-B operation of the decoder may be performed in reverse order of the Inception-resnet-B operation performed by the encoder.

The autoencoder according to one embodiment of the present invention may adjust scaling sizes a, b, and c of the Inception-resnet-B operation, and learning may proceed through the adjustment.

Figure 12:
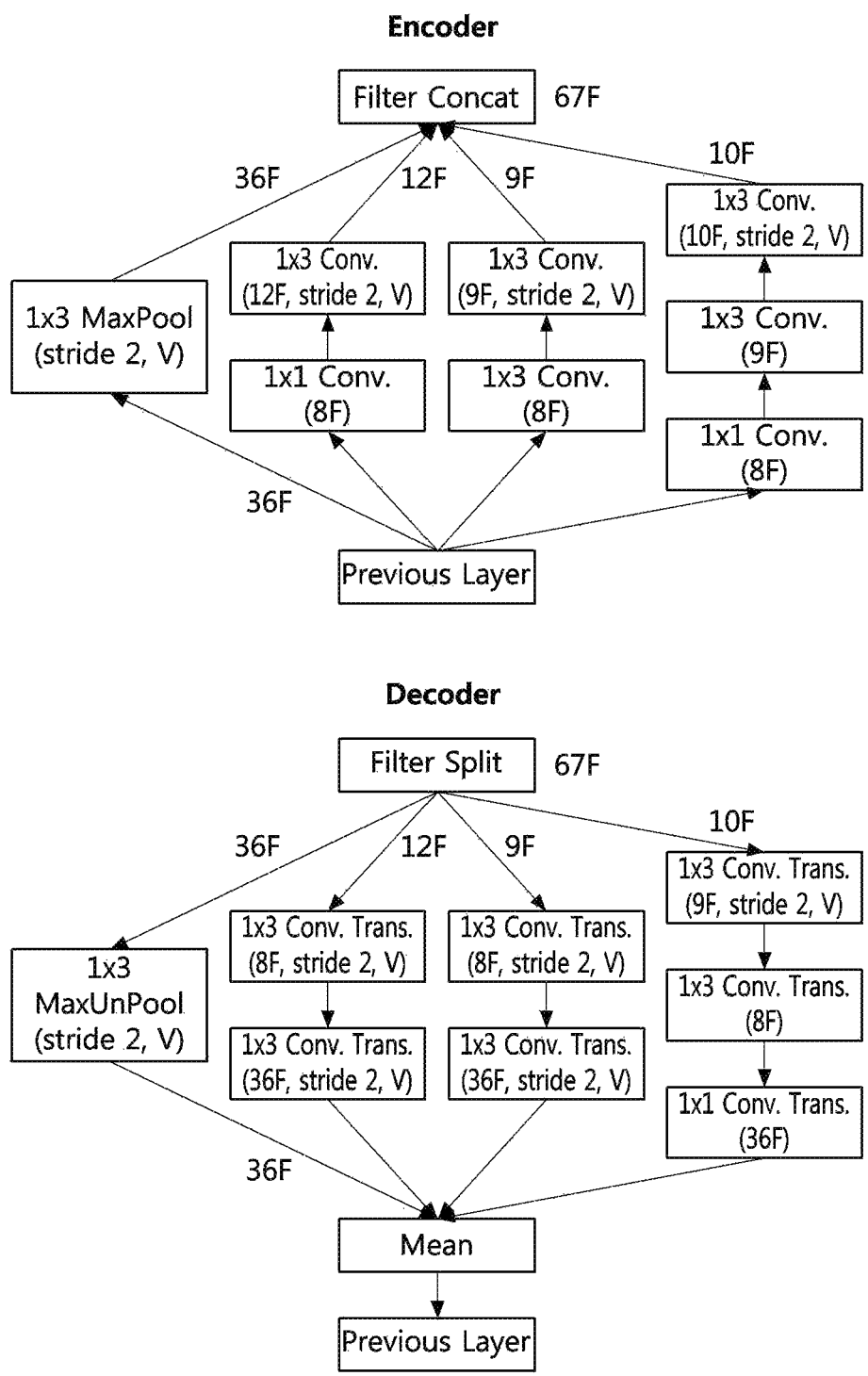
FIG. 12 is a conceptual diagram for describing a Reduction-B operation in the autoencoder based on the inception-residual network-v2 according to one embodiment of the present invention.

FIG. 12 is a conceptual diagram for describing a Reduction-B operation in the autoencoder based on the inception-residual network-v2 according to one embodiment of the present invention.

Referring to FIG. 12, the Reduction-B operation of the autoencoder according to one embodiment of the present invention may be performed in each of the encoder and the decoder of FIG. 5. In other words, the Reduction-B operation of an encoder of FIG. 12 may be performed in the encoder of FIG. 5, and the Reduction-B operation of a decoder of FIG. 12 may be performed in the decoder of FIG. 5. The Reduction-B operation of the encoder may distribute input data into four pieces of data, sequentially perform 1×1 Conv., 1×3 Conv., and 1×3 Conv.(stride 2) on the first distributed data, perform 1×3 Conv. and 1×3 Conv.(stride 2) on the second distributed data, perform 1×1 Conv. and 1×3 Conv.(stride 2) on the third distributed data, and perform 1×3 MaxPool(stride 2) on the fourth distributed data. Further, Reduction-B operation of the encoder may sum the distributed and processed input data to generate output data of the Reduction-B operation. Also, the Reduction-B operation of the autoencoder according to the present invention may be identically performed as the Reduction-B operation of the conventional inception-residual network-v2 as well as being performed according to the Reduction-B operation described above, but the present invention is not limited thereto. The Reduction-B operation of the decoder may be performed in reverse order of the Reduction-B operation performed by the encoder.

Figure 13:
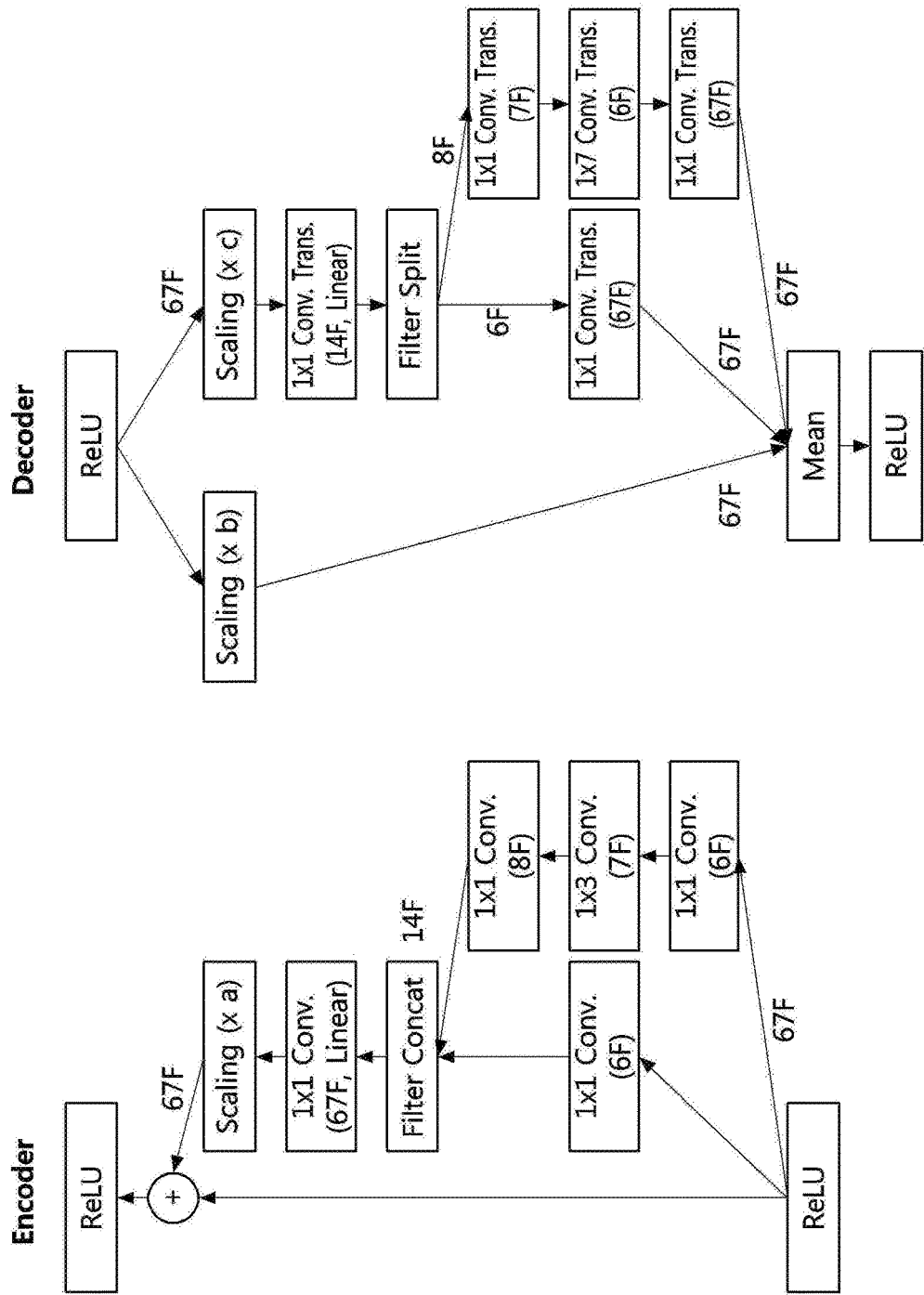
FIG. 13 is a conceptual diagram for describing an Inception-resnet-C operation in the autoencoder based on the inception-residual network-v2 according to one embodiment of the present invention.

FIG. 13 is a conceptual diagram for describing an Inception-resnet-C operation in the autoencoder based on the inception-residual network-v2 according to one embodiment of the present invention.

Referring to FIG. 13, the Inception-resnet-C operation of the autoencoder according to one embodiment of the present invention may be performed in each of the encoder and the decoder of FIG. 5. In other words, the Inception-resnet-C operation of an encoder of FIG. 13 may be performed in the encoder of FIG. 5, and the Inception-resnet-C operation of a decoder of FIG. 13 may be performed in the decoder of FIG. 5. The Inception-resnet-C operation of the encoder may distribute input data into three pieces of data, sequentially perform 1×1 Conv., 1×3 Conv. and 1×1 Conv. on the first distributed data, and perform 1×1 Conv. on the second distributed data. The first and second distributed data may be summed to undergo 1×1 Conv.(Linear) and scaling, and output data having undergone scaling may be added to input data among the three distributed pieces of data, which has not undergone any operation. Also, the Inception-resnet-C operation of the autoencoder according to the present invention may be identically performed as Inception-resnet-C operation of the conventional inception-residual network-v2 as well as being performed according to the Inception-resnet-C operation described above, but the present invention is not limited thereto. The Inception-resnet-C operation of the decoder may be performed in reverse order of the Inception-resnet-C operation performed by the encoder.

The autoencoder according to one embodiment of the present invention may adjust scaling sizes a, b, and c of Inception-resnet-C operation, and learning may proceed through the adjustment.

Figure 14:
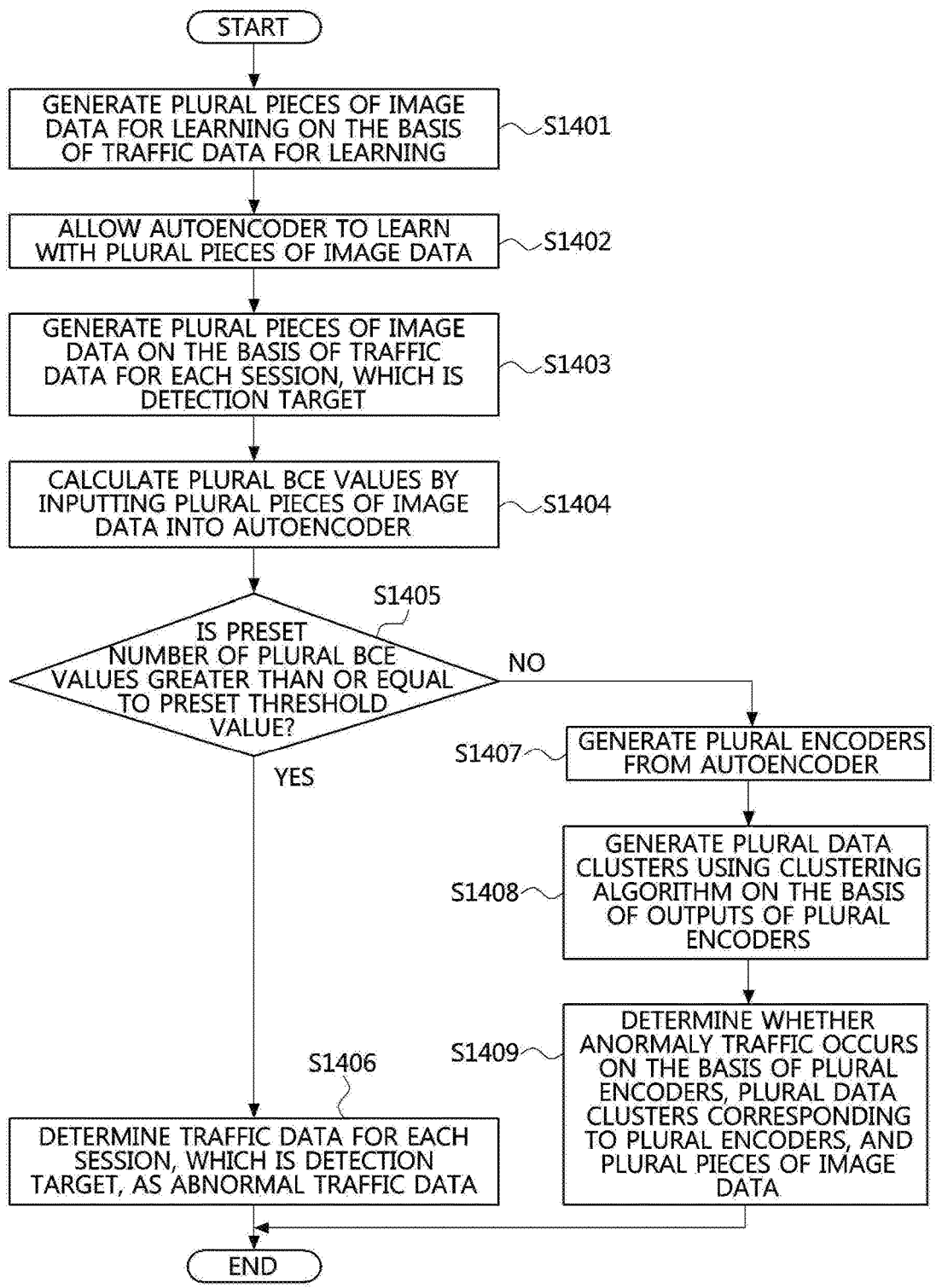
FIG. 14 is a flowchart for describing a method for detecting anomaly traffic according to one embodiment of the present invention.

FIG. 14 is a flowchart for describing a method for detecting anomaly traffic according to one embodiment of the present invention.

Referring to FIG. 14, the method for detecting anomaly traffic according to one embodiment of the present invention may first divide traffic data for learning into preset units and convert the plurality of units of divided traffic data for learning to generate a plurality of pieces of image data for learning (S1401). Here, the traffic data for learning may be divided into a plurality of HTTP request units. For example, when five HTTP requests are divided into three units, the five HTTP requests may be divided into 1-2-3, 2-3-4, and 3-4-5, and the three divided HTTP requests may be concatenated to form a single sentence and may be converted into an image according to the method described in FIG. 2. Thereafter, an autoencoder based on the inception-residual network-v2 may learn using the plurality of pieces of image data for learning (S1402). After the autoencoder learns, the anomaly traffic detection device 100 may receive traffic data for each session that is a detection target through the traffic data acquisition unit 10, divide the traffic data for each session into a preset unit, and convert a plurality of units of divided traffic data for each session to generate a plurality of pieces of image data (S1403). Here, a method for generating the traffic data for each session as the plurality of pieces of image data may use the same method as a method of generating the traffic data for learning as the image data for learning. The plurality of pieces of image data may be input to the autoencoder that completes the learning, and as a result, a plurality of BCE values corresponding to the plurality of pieces of image data may be calculated (S1404). Thereafter, the anomaly traffic detection device 100 may compare the plurality of calculated BCE values with a preset threshold value (S1405), and, when more than a preset specific number of BCE values among the plurality of calculated BCE values are greater than or equal to the preset threshold value, the anomaly traffic detection device 100 may determine the traffic data for each session, which is a detection target, as anomaly traffic data (S1406).

However, when more than a preset specific number of BCE values among the plurality of calculated BCE values are less than the preset threshold value, the anomaly traffic detection device 100 may use a clustering algorithm to determine whether the traffic data for each session, which is a detection target, is abnormal. In this case, the anomaly traffic detection device 100 may generate a plurality of encoders from the autoencoder (S1407), and generate a plurality of data clusters corresponding to the plurality of encoders using the clustering algorithm on the basis of outputs of the plurality of encoders (S1408).

Thereafter, the anomaly traffic detection device 100 may determine whether anomaly traffic occurs on the basis of the plurality of encoders, the plurality of data clusters corresponding to the plurality of encoders, and the image data generated from the plurality of pieces of traffic data for each session, which is a detection target (S1409), and a detailed determination method will be described below with reference to FIG. 15

Figure 15:
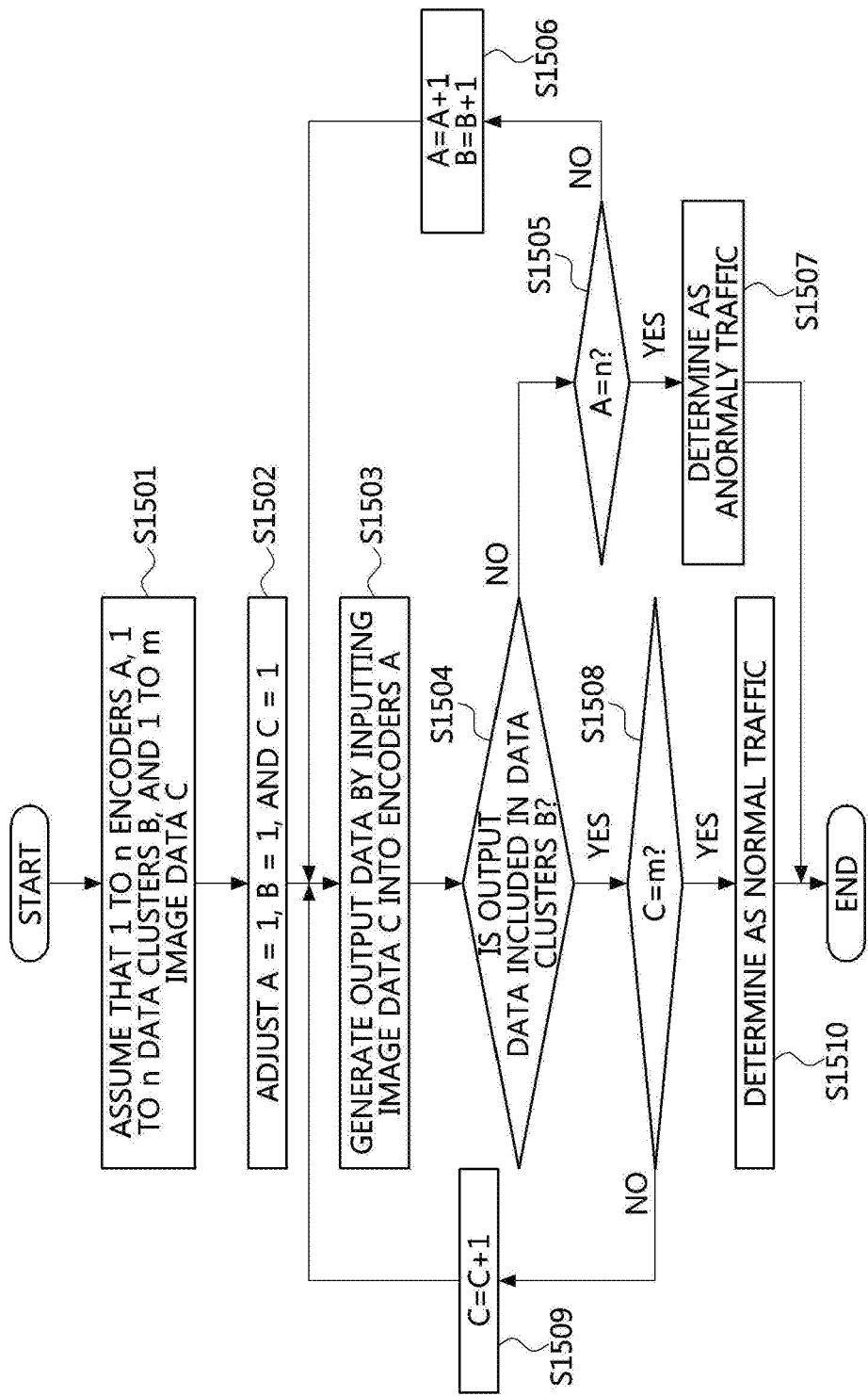
FIG. 15 is a flowchart for describing a method for determining whether an abnormality occurs using an encoder, a data cluster corresponding to the encoder, and image data in the method for detecting anomaly traffic according to one embodiment of the present invention.

FIG. 15 is a flowchart for describing a method for determining whether an abnormality occurs using an encoder, a data cluster corresponding to the encoder, and an image data in the method for detecting anomaly traffic according to one embodiment of the present invention.

Here, a single encoder may generate a single data cluster, but, in another embodiment of the present invention, a single encoder may generate a plurality of data clusters.

Referring to FIG. 15, a method for detecting anomaly traffic according to one embodiment of the present invention will be described when it is assumed that n sets of image data for learning, n encoders according to the n sets of image data for learning, and n data clusters according to the n encoders are generated, and m image data are generated on the basis of traffic data for each session, which is a detection target (S1501), and an anomaly traffic detection is initiated by setting a first encoder, a first data cluster, and first image data as a reference value or an initial value (S1502). The method for detecting anomaly traffic according to the present invention may input the image data into the encoder to generate output data (S1503), and may determine whether the output data is included in a region at which a data cluster corresponding to the encoder, in which the output data is used, is present (S1504).

When the output data is not included in the data cluster, the method may determine whether the used encoder is a last encoder (S1505), and, when the used encoder is not the last encoder, the method may select a next encoder and a data cluster corresponding to the next encoder (S1506), and, when the used encoder is the last encoder, the method may detect the traffic data for each session, which is a detection target, as anomaly traffic data (S1507).

When the output data is included in the data cluster, the method may determine whether the used image data is last image data (S1508), and, when the used image data is not the last image data, the method may select next image data (S1509), and, when the used image data is the last image data, the method may detect the traffic data for each session, which is a detection target, as normal traffic (S1510).

Figure 16:
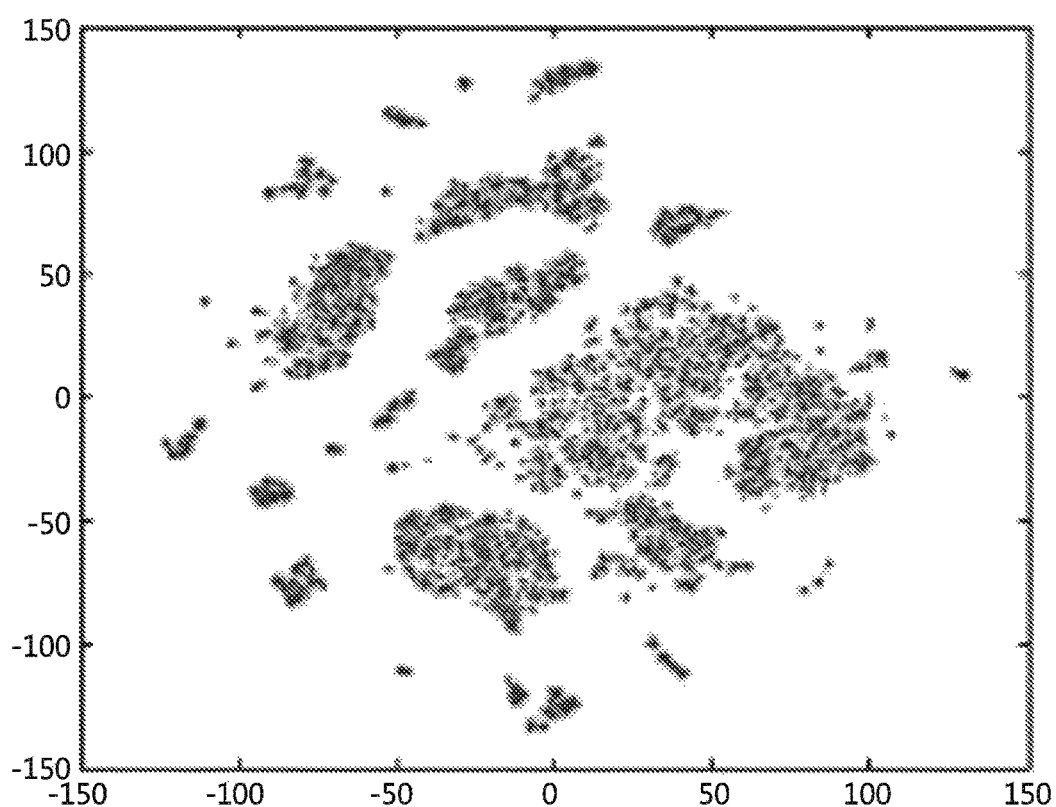
FIG. 16 is a diagram illustrating a result obtained by removing the decoder from the autoencoder, and applying t-distributed stochastic neighbor embedding (t-SNE) to multi-dimensional data that is an output of the encoder according to one embodiment of the present invention.

FIG. 16 is a diagram illustrating a result obtained by removing the decoder from the autoencoder, and applying t-SNE to multi-dimensional data that is an output of the encoder according to one embodiment of the present invention.

Referring to FIG. 16, when a decoding operation is removed from the autoencoder of the present invention and the t-SNE is applied to the autoencoder, similar traffic may be clustered in a narrow region. The t-SNE may be a machine learning algorithm or a clustering algorithm used for dimensional reduction of data, and may correspond to a nonlinear dimensional reduction technique. The t-SNE may have a feature of mapping similar data to adjacent points and other data to distant points.

The apparatus of detecting anomaly traffic according to the present invention may define data gathering in a narrow region in a processing result of normal traffic as a single data cluster, and the data cluster may be differently defined according to each of the encoders. More specifically, among results in which a clustering algorithm is applied to outputs of the encoders, one or a plurality of data clusters in which a largest amount of data gathers in a narrowest region may be defined or selected as a data cluster corresponding to the encoders.

Figure 17A:
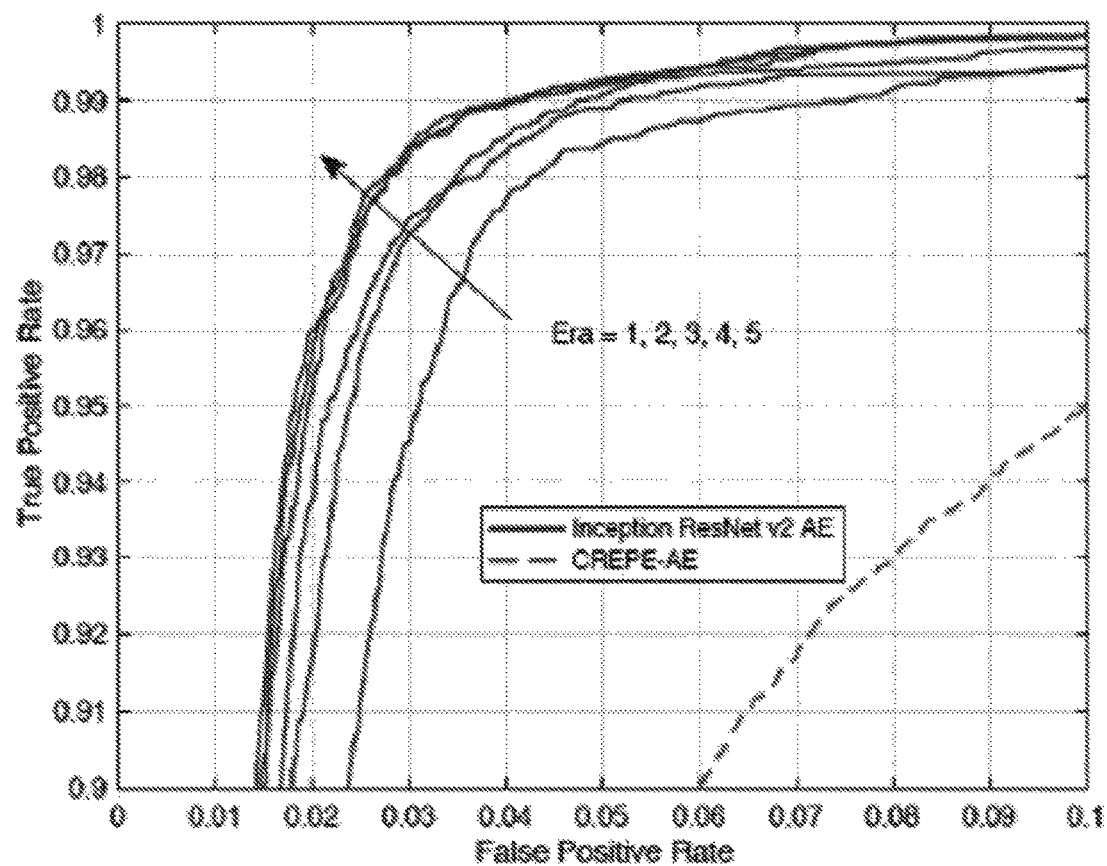
FIG. 17A and FIG. 17B are a diagram for describing the performance of the apparatus for detecting anomaly traffic according to one embodiment of the present invention.
Figure 17B:
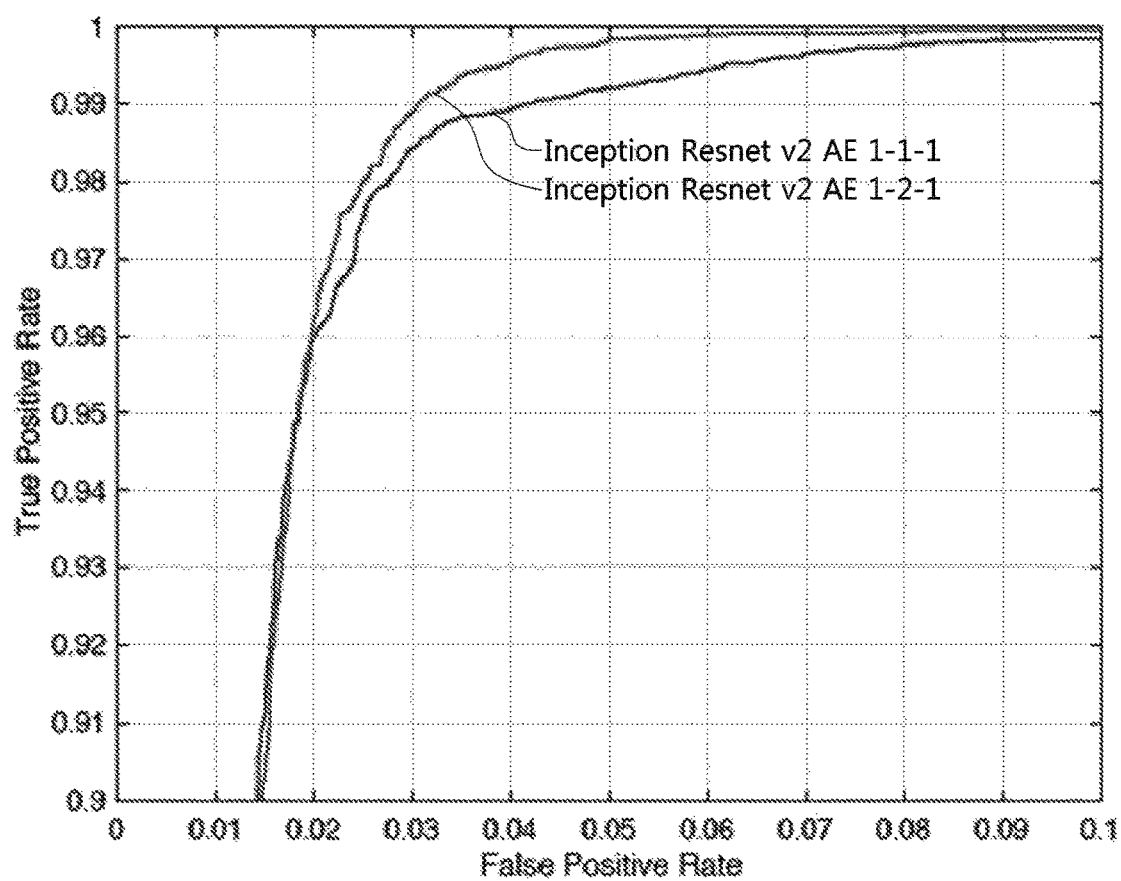

FIG. 17A and FIG. 17B are a diagram for describing the performance of the apparatus for detecting anomaly traffic according to one embodiment of the present invention.

Referring to FIG. 17A and FIG. 17B, performance of the apparatus for detecting anomaly traffic according to one embodiment of the present invention may be denoted using a receiver operating characteristic (ROC) curve. The ROC curve is a curve for determining a reference value using sensitivity and specificity, and, as an area under the curve (AUC), which is a value obtained by calculating an area under the ROC curve, is large, performance may be determined to be superior. Herein, the output of the autoencoder according to one embodiment of the present invention may be denoted by BCE which is a real value, and, since the autoencoder learns with normal traffic data, low BCE may be output with respect to normal traffic data, and high BCE may be output with respect to anomaly traffic data. Therefore, a threshold value is set to BCE, and, when BCE of the autoencoder is less than the threshold value, the output of the autoencoder may be detected as normal traffic, and, when the BCE of the autoencoder is higher than or equal to the threshold value, the output of the autoencoder may be detected as anomaly traffic. FIG. 17A and FIG. 17B illustrate calculation results with respect to a true positive rate of detecting anomaly traffic as anomaly traffic and a false positive rate of detecting normal traffic as anomaly traffic according to the above-described threshold value.

FIG. 17A is a graph comparing anomaly traffic detection results using the autoencoder based on the inception-residual network-v2 according to one embodiment of the present invention, and an autoencoder based on CREPE. Referring to FIG. 17A, it can be determined that the apparatus for detecting anomaly traffic using the autoencoder based on an inception-residual network-v2 has higher performance than the autoencoder based on CREPE. Further, Era may refer to a repetition rate of learning, and it can be determined that an AUC increases as the Era increases such that higher performance can be obtained.

FIG. 17B is a graph comparing results according to structures of the autoencoder according to one embodiment of the present invention. Referring to FIG. 17B, in the inception-residual network-v2 according to one embodiment of the present invention, it can be determined that a 1-2-1 structure has higher performance than a 1-1-1 structure. Herein, the 1-1-1 structure may refer to repetition times of each of the Inception-resnet-A operation, Inception-resnet-B operation, and Inception-resnet-C operation in the autoencoder, and the 1-2-1 structure may refer that the Inception-resnet-B operation has been repeated twice. In other words, it can be determined that, as the number of modules of the inception-residual network-v2 increases, the network is more complicated, and performance thereof is also better.

While the example embodiments of the present invention and their advantages have been described in detail, it should be understood that various changes, substitutions and alterations may be made herein without departing from the scope of the invention.

What is claimed is:

1. A method for detecting anomaly traffic, comprising:
    generating a plurality of different encoders on the basis of traffic data for learning;
    generating a plurality of pieces of image data on the basis of traffic data for each session, which is a detection target;
    determining whether the traffic data for each session is abnormal based on binary cross entropy (BCE) of the plurality of pieces of image data and a preset threshold value;
    generating data clusters according to each of the plurality of different encoders using a clustering algorithm based on the traffic data for learning and the plurality of different encoders when the traffic data for each session is determined normal based on the BCE;
    generating output data by inputting the plurality of image data to each of the plurality of different encoders for each image data sequentially; and
    re-determining whether the traffic data for each session is abnormal based on whether the output data included in the data cluster according to each of the different encoders;
    wherein the plurality of different encoders outputs different data for one image data, and wherein the generating a plurality of pieces of image data comprises:
    converting each character constituting a character string included in the traffic data for each session into a plurality of one-hot vectors in a reverse order;
    generating a matrix by combining the plurality of one-hot vectors; and
    generating an image representing the location of each character in the matrix.

2. The method of claim 1, wherein the generating of the plurality of different encoders on the basis of traffic data for learning includes:
    dividing the traffic data for learning into a preset unit;
    converting the divided traffic data for learning into a plurality of pieces of image data for learning; and
    generating the plurality of different encoders on the basis of the plurality of pieces of image data for learning.

3. The method of claim 2, wherein the generating of the plurality of different encoders on the basis of the plurality of pieces of image data for learning includes learning the plurality of pieces of image data for learning through an autoencoder based on an inception-residual network-v2 using convolutional neural networks to generate the plurality of different encoders.

4. The method of claim 3, wherein the determining whether the traffic data for each session is abnormal based on BCE of the plurality of pieces of image data and a preset threshold value includes:
    calculating BCE by inputting the plurality of pieces of image data to the autoencoder; and
    determining whether the traffic data for each session is abnormal by comparing the BCE with the preset threshold value.

5. The method of claim 4, wherein the determining whether the traffic data for each session is abnormal by comparing the BCE with the preset threshold value includes determining that the traffic data for each session is abnormal when the BCE is equal to or greater than the preset threshold value.

6. The method of claim 4, wherein the determining whether the traffic data for each session is abnormal by comparing the BCE with the preset threshold value further includes determining that the traffic data for each session is not abnormal when the BCE is less than the preset threshold value.

7. The method of claim 2, wherein the generating data clusters according to each of the plurality of different encoders using a clustering algorithm based on the traffic data for learning and the plurality of different encoders when the traffic data for each session is determined abnormal includes:
    inputting the divided traffic data for learning to the plurality of different encoders and storing each of output data of the plurality of different encoders; and
    generating the data clusters according to each of the plurality of different encoders by applying the clustering algorithm to each of the stored output data of the plurality of different encoders.

8. The method of claim 1, wherein the re-determining whether the traffic data for each session is abnormal based on whether the output data included in the data cluster according to each of the different encoders includes re-determining that the traffic data for each session is abnormal when the output data is not included in any one of the data clusters according to the plurality of different encoders.

9. An apparatus for detecting anomaly traffic, comprising:
    a processor; and
    a memory configured to store at least one command executed through the processor,
    wherein the at least one command including
    generating a plurality of different encoders on the basis of traffic data for learning,
    generating a plurality of pieces of image data on the basis of the traffic data for each session, which is a detection target, determining whether the traffic data for each session is abnormal based on binary cross entropy (BCE) of the plurality of pieces of image data and a preset threshold value, generating data clusters according to each of the plurality of different encoders using a clustering algorithm based on the traffic data for learning and the plurality of different encoders when the traffic data for each session is determined normal based on the BCE, generating output data by inputting the plurality of image data to each of the plurality of different encoders for each image data sequentially, and re-determining whether the traffic data for each session is abnormal based on whether the output data included in the data cluster according to each of the different encoders, wherein the plurality of different encoders outputs different data for one image data, and wherein the generating a plurality of pieces of image data comprises:

converting each character constituting a character string included in the traffic data for each session into a plurality of one-hot vectors in a reverse order;

generating a matrix by combining the plurality of one-hot vectors; and generating an image representing the location of each character in the matrix.

10. The apparatus of claim 9, wherein the at least one command includes dividing the traffic data for learning into a preset unit, converting the divided traffic data for learning into a plurality of pieces of image data for learning, and generating the plurality of different encoders on the basis of the plurality of pieces of image data for learning.

11. The apparatus of claim 10, wherein the at least one command includes learning the plurality of pieces of image data for learning through an autoencoder based on an inception-residual network-v2 using convolutional neural networks to generate the plurality of different encoders.

12. The apparatus of claim 11, wherein the at least one command includes calculating BCE by inputting the plurality of pieces of image data to the autoencoder, and determining whether the traffic data for each session is abnormal by comparing the BCE with a preset threshold value.

13. The apparatus of claim 12, wherein the at least one command includes determining that the traffic data for each session is abnormal when the BCE is equal to or greater than the preset threshold value.

14. The apparatus of claim 12, wherein the at least one command includes determining that the traffic data for each session is not abnormal when the BCE is less than the preset threshold value.

15. The apparatus of claim 10, wherein the at least one command includes inputting the divided traffic data for learning to the plurality of different encoders and store each of output data of the plurality of different encoders, and generating the data clusters according to the plurality of different encoders by applying the clustering algorithm to each of the stored output data of the plurality of different encoders.

16. The apparatus of claim 9, wherein the at least one command includes re-determining that the traffic data for each session is abnormal when the output data is not included in any one of the data clusters according to the plurality of different encoders.

* * * * *